United States Patent
Rainwater

(10) Patent No.: US 10,706,351 B2
(45) Date of Patent: Jul. 7, 2020

(54) RECURRENT ENCODER AND DECODER

(71) Applicant: AMERICAN SOFTWARE SAFETY RELIABILITY COMPANY, Atlanta, GA (US)

(72) Inventor: Blake Rainwater, Roswell, GA (US)

(73) Assignee: American Software Safety Reliability Company, Atlanta, GA (US)

(*) Notice: Subject to any disclaimer, the term of this patent is extended or adjusted under 35 U.S.C. 154(b) by 982 days.

(21) Appl. No.: 15/251,938

(22) Filed: Aug. 30, 2016

(65) Prior Publication Data

US 2018/0060727 A1    Mar. 1, 2018

(51) Int. Cl.
*G06N 3/04* (2006.01)
*G06N 3/08* (2006.01)

(52) U.S. Cl.
CPC ......... *G06N 3/0454* (2013.01); *G06N 3/0445* (2013.01); *G06N 3/082* (2013.01)

(58) Field of Classification Search
None
See application file for complete search history.

(56) References Cited

U.S. PATENT DOCUMENTS

| | | | |
|---|---|---|---|
| 9,547,579 B1 | 1/2017 | Shen et al. | |
| 10,380,264 B2 * | 8/2019 | Lee | G06F 40/268 |
| 2008/0082805 A1 | 4/2008 | Wakabayashi | |
| 2011/0197177 A1 | 8/2011 | Mony | |
| 2011/0302118 A1 | 12/2011 | Melvin et al. | |
| 2014/0173563 A1 | 6/2014 | Dias et al. | |
| 2015/0082277 A1 | 3/2015 | Champlin-Scharff et al. | |
| 2015/0135166 A1 | 5/2015 | Tarlow et al. | |
| 2015/0222730 A1 | 8/2015 | Gower et al. | |
| 2015/0235282 A1 | 8/2015 | Kamath | |
| 2016/0196504 A1 | 7/2016 | Allen et al. | |
| 2016/0307094 A1 * | 10/2016 | Davis | G06F 21/564 |
| 2017/0060735 A1 | 3/2017 | Yoshida et al. | |
| 2017/0060855 A1 * | 3/2017 | Song | G06F 40/205 |
| 2017/0212829 A1 | 7/2017 | Bales et al. | |
| 2017/0323203 A1 * | 11/2017 | Matusov | G06N 3/0445 |
| 2017/0372696 A1 * | 12/2017 | Lee | G10L 15/02 |
| 2018/0011843 A1 * | 1/2018 | Lee | G06F 40/44 |
| 2018/0046618 A1 * | 2/2018 | Lee | G06F 16/3344 |
| 2018/0052829 A1 * | 2/2018 | Lee | G06N 3/0454 |
| 2018/0060727 A1 * | 3/2018 | Rainwater | G06N 3/0445 |
| 2018/0276525 A1 * | 9/2018 | Jiang | G06N 3/0445 |

(Continued)

OTHER PUBLICATIONS

Sutskever et al., "Sequence to Sequence Learning with Neural Networks", 2014, pp. 1-9 (Year: 2014).*

(Continued)

*Primary Examiner* — Paulinho E Smith
(74) *Attorney, Agent, or Firm* — Lee & Hayes, P.C.

(57) ABSTRACT

An encoder and decoder for translating sequential data into a fixed dimensional vector are created by applying an encoding-trainer input vector set as input to an encoding neural network to generate an encoding-trainer output vector set. One vector of the encoding-trainer output vector set is selected and a decoding-trainer input vector set is generated from it. A decoding neural network is trained by applying the generated decoding-trainer input vector set to the decoding neural network. The encoder and decoder can be used in implementations processing sequential data.

20 Claims, 15 Drawing Sheets

(56) References Cited

U.S. PATENT DOCUMENTS

| | | | | |
|---|---|---|---|---|
| 2018/0349359 | A1* | 12/2018 | McCann | G06N 3/0445 |
| 2018/0373682 | A1* | 12/2018 | McCann | G06N 3/0445 |
| 2018/0373704 | A1* | 12/2018 | Lee | G06F 40/49 |
| 2019/0034416 | A1* | 1/2019 | Al Hasan | G06N 3/0445 |
| 2019/0129947 | A1* | 5/2019 | Shin | G06F 40/284 |
| 2019/0138606 | A1* | 5/2019 | Tu | G06F 40/49 |
| 2019/0171720 | A1* | 6/2019 | Song | G06F 40/55 |

OTHER PUBLICATIONS

Cho et al., "On the Properties of Neural Machine Translation :Encoder-Decoder approaches", Oct. 7, 2014, pp. 1-9 (Year: 2014).*

Saini et al., "Neural Machine Translation for English to Hindi", 2018, IEEE, pp. 25-30 (Year: 2018).*

Zhou et al., "Deep Recurrent Models with Fast-Forward Connections for Neural Machine Translation", Jul. 2016, Transactions of the Association for Computational Linguistics, vol. 4, pp. 371-383. (Year: 2016).*

Office Action for U.S. Appl. No. 15/410,005, dated Jul. 20, 2018, Bales, "Deep Learning Source Code Analyzer and Repairer ", 35 pages.

Chollet, "Building Autoencoders in Keras", The Keras Blog, May 14, 2016, 16 pages.

Gal, "A Theoretically Grounded Application of Dropout in Recurrent Neural Networks", Cornell University Library http://arxiv.org/abs/1512.05287), Dec. 16, 2015, 13 pages.

Kingma, et al., "Adam: A Method for Stochastic Optimization", 3rd International Conference for Learning Representations, San Diego 2015, Cornell University Library (https://arxiv.org/abs/1412.6980), Dec. 22, 2014, 15 pages.

Mikolov et al., "Distributed Representations of Words and Phrases and their Compositionality", 2013, pp. 1-9.

Srivastava et al., "Dropout: A Simple Way to Prevent Neural Networks From Overfilling", Journal of Machine Learning Research, 2014 vol. 15, pp. 1929-1958.

* cited by examiner

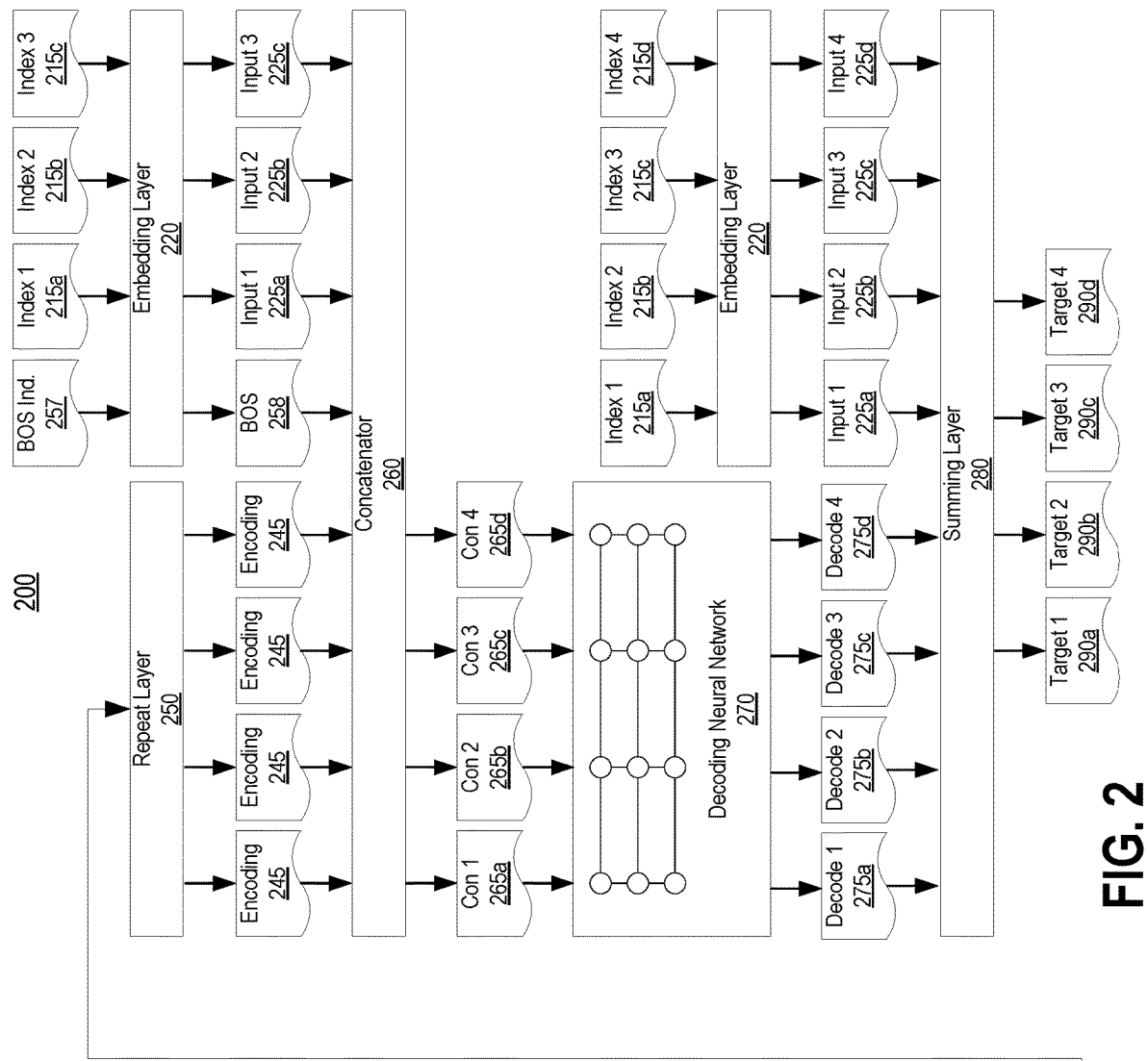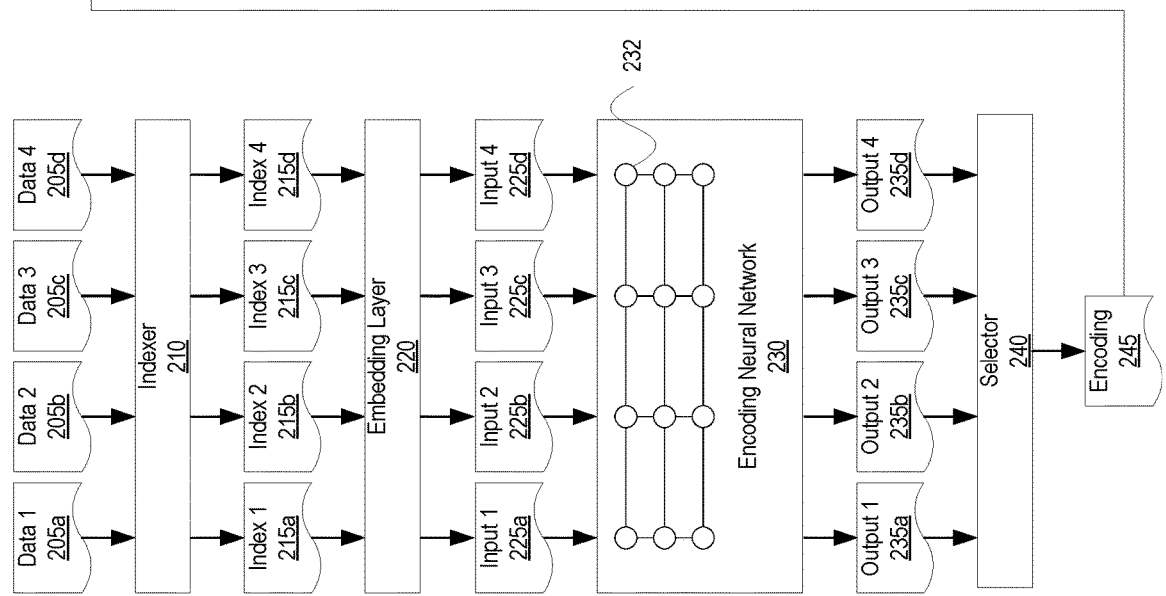
FIG. 2

RECURRENT ENCODER AND DECODER

TECHNICAL FIELD

The following disclosure relates to the technical fields of deep learning and artificial neural networks.

BACKGROUND

Deep learning is a type of machine learning that attempts to model high-level abstractions in data by using multiple processing layers or multiple non-linear transformations. Deep learning uses representations of data, typically in vector format, where each datum corresponds to an observation with a known outcome. By processing over many observations with known outcomes, deep learning allows for a model to be developed that can be applied to a new observation for which the outcome is not known.

Some deep learning techniques are based on interpretations of information processing and communication patterns within nervous systems. One example is an artificial neural network. Artificial neural networks are a family of deep learning models based on biological neural networks. They are used to estimate functions that depend on a large number of inputs where the inputs are unknown. In a classic presentation, artificial neural networks are a system of interconnected nodes, called neurons, that exchange messages via connections, called synapses between the neurons.

An example classic artificial neural network system can be represented in three layers: the input layer, the hidden layer, and the output layer. Each layer contains a set of neurons. Each neuron of the input layer is connected via numerically weighted synapses to nodes of the hidden layer, and each neuron of the hidden layer is connected to the neurons of the output layer by weighted synapses. Each neuron has an associated activation function that specifies whether the neuron is activated based on the stimulation it receives from its inputs synapses.

An artificial neural network learns using examples. The learning process can be referred to as training the neural network. During training, a data set of known inputs with known outputs is collected. Inputs to the artificial neural network are typically vectors that are applied to the input layer of the network. Based on some combination of the value of the activation function for each input neuron, the sum of the weights of synapses connecting input neurons to neurons in the hidden layer, and the activation function of the neurons in the hidden layer, some neurons in the hidden layer will activate. This, in turn, will activate some of the neurons in the output layer based on the weight of synapses connecting the hidden layer neurons to the output neurons and the activation functions of the output neurons. The activation of the output neurons is the output of the network, and this output, like the input, is typically represented as a vector. Learning occurs by comparing the output generated by the network for a given input to that input's known output. Using the difference between the output produced by the network and the expected output, the weights of synapses are modified starting from the output side of the network and working toward the input side of the network. Once the difference between the output produced by the network is sufficiently close to the expected output (defined by the cost function of the network), the network is said to be trained to solve a particular problem. While the above example explains the concept of artificial neural networks using one hidden layer, some artificial neural networks include several hidden layers.

SUMMARY

In one aspect, a method for translating between a first context and a second context, that is different from the first context, includes encoding source data of the first context using an encoding neural network to create an encoded input fixed dimensional vector representation of the source data. The encoded input fixed dimensional vector is applied as input to a translator neural network trained to generate an output encoded fixed dimensional vector representation of target data of the second context. The output encoded fixed dimensional vector representation is decoded using a decoding neural network to recreate the target data.

Various implementations of this aspect may include one or more of the following features. In some implementations, the encoding neural network is trained by applying a plurality of sequences of training input vectors from a first data corpus of the first context as input to the encoding neural network. Encoding the source data can include generating a sequence of input vectors corresponding to the source data, applying the sequence of input vectors to the encoding network, and selecting one vector from the output of the encoding neural network. In some implementations, generating a sequence of input vectors corresponding to the source data includes generating sequential indices for the source data and mapping the sequential indices to vectors in an embedding layer. In some implementations, the decoding neural network is trained by applying a plurality of encoded fixed dimensional vectors representing sequential data encoded from a second data corpus of the second context as input to the decoding neural network, which can include creating training vector sets for each of the plurality of encoded fixed dimensional vectors. The training vector sets for each of the plurality of encoded fixed dimensional vectors can be created by concatenating each of the plurality of encoded fixed dimensional vectors with a beginning of sequence vector and a subset of vectors used to encode each of the plurality of encoded fixed dimensional vectors. In some implementations, decoding the output encoded fixed dimensional vector representation using the decoding neural network includes concatenating the output encoded fixed dimensional vector representation with a beginning of sequence vector used when training the decoding neural network, and in some implementations, can further include concatenating the output encoded fixed dimensional vector representation with one or more output vectors of the decoding neural network.

Other embodiments of this aspect include corresponding computer systems, apparatus, and computer programs recorded on one or more computer storage devices, each configured to perform the operations of the method summarized above.

In another aspect, a method for creating an encoder and a decoder includes training an encoding neural network by applying an encoding-trainer input vector set as input to the encoding neural network to generate an encoding-trainer output vector set so that the encoding-trainer output vector set is an additive inverse of the encoding-trainer input vector set. The encoding-trainer input vector set can correspond to sequential data. The method can further include determining a selected encoding vector by selecting one vector of the encoding-trainer output vector set and generating a decoding-trainer input vector set by concatenating the selected encoding vector with a beginning of sequence vector and concatenating the selected encoding vector with each non-selected vector of the encoding-training output vector set. The method can further include training a decoding neural network by applying the generated decoding-trainer input vector set to the decoding neural network so that the decoding neural network outputs an additive inverse of the encoding-trainer input vector set.

Various implementations of this aspect may include one or more of the following features. In some implementations, the encoding neural network includes a plurality of hidden layers, and the encoding neural network is trained such that connections between nodes of consecutive hidden layers of the plurality of hidden layers have the same weight. In some implementations, the decoding neural network includes a plurality of hidden layers and the decoding neural network can be trained such that connections between nodes of consecutive hidden layers of the plurality of hidden layers have the same weight.

Other embodiments of this aspect include corresponding computer systems, apparatus, and computer programs recorded on one or more computer storage devices, each configured to perform the operations of the method summarized above.

In another aspect a method for decoding an encoded fixed dimensional vector into a sequence of data includes performing a number of iterations equal to a set size. Each iteration can include concatenating the encoded fixed dimensional vector with a beginning of sequence vector to configure a first vector of an ordered input vector set of set size vectors, concatenating the encoded fixed dimensional vector with an ordered output vector set determined during a previous iteration of the number of iterations to configure subsequent vectors of the ordered input vector set, the subsequent vectors occurring in the ordered input vector set after the first vector of the ordered input vector set, and applying the ordered input vector set to a decoding neural network trained concurrently with an encoding neural network uses to encode the encoded fixed dimensional vector. The method can further include determining, once the number of iterations have been performed, the sequence of data based on the ordered output vector set of the last iteration.

Various implementations of this aspect may include one or more of the following features. In some implementations, concatenating the encoded fixed dimensional vector with the ordered output vector set determined during the previous iteration includes concatenating the encoded fixed dimensional vector with a vector of the ordered output vector set located at a position in the sequence equal to the number of iterations performed plus one. In some implementations, the decoding neural network and encoding neural network were trained using an embedding layer and determining the sequence of data is further based on correlating the ordered output vector set of the last iteration with the embedding layer. In some implementations, the decoding neural network is trained by creating decoding training vector sets based on a vector output from the encoding neural network during training of the encoding neural network and creating the training vector sets includes concatenating the vector output from the encoding neural network with a beginning of sequence vector and input vector sets provided as input to the encoding neural network during training.

Other embodiments of this aspect include corresponding computer systems, apparatus, and computer programs recorded on one or more computer storage devices, each configured to perform the operations of the method summarized above.

The details of one or more implementations are set forth in the accompanying drawings and the description below. Other features will be apparent from the description and drawings, and from the claims.

BRIEF DESCRIPTION OF THE DRAWINGS

FIG. 2 shows an example data flow for training an encoder and decoder consistent with disclosed embodiments.

DETAILED DESCRIPTION

Figure 1:
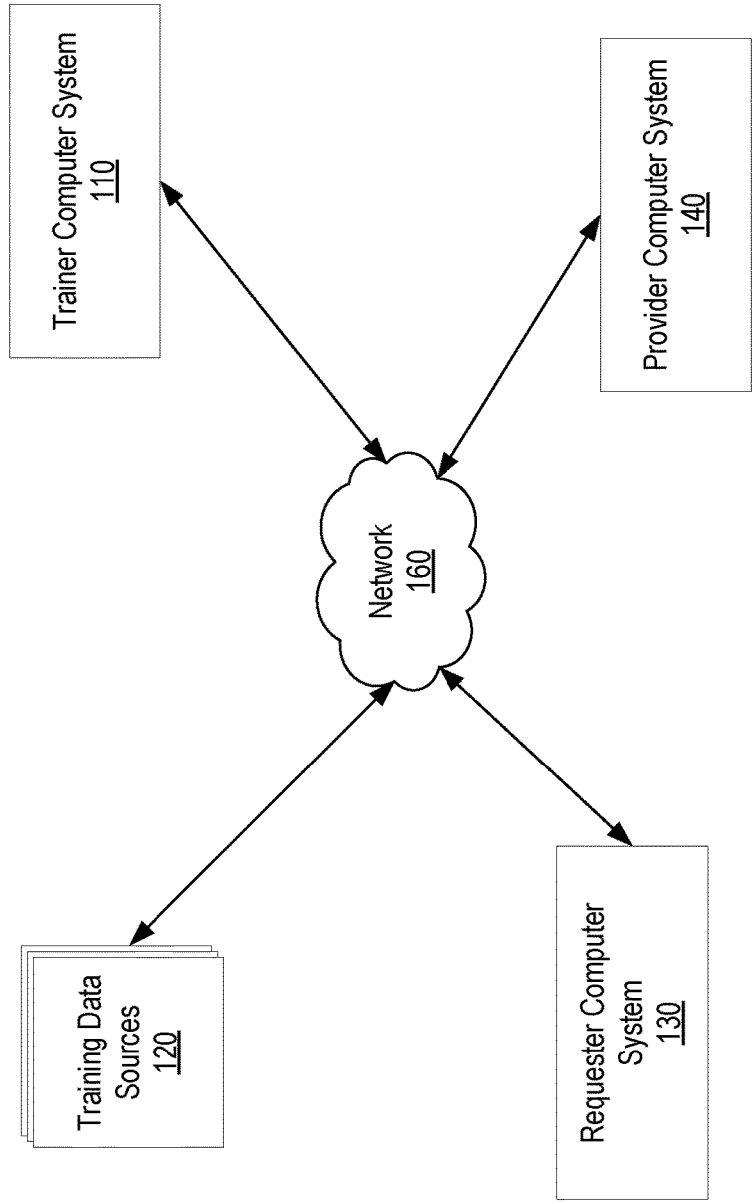
FIG. 1 shows example system for creating an encoder and decoder, and using an encoder and decoder, consistent with disclosed embodiments.

There are many artificial neural network models. One such model uses a recurrent neural network. In a traditional artificial neural network, the inputs are independent of previous inputs, and each training cycle does not have memory of previous cycles. This approach removes the context of an input (e.g., the inputs before it) from training, which is not advantageous for inputs modeling sequences, such as sentences or statements. Recurrent neural networks, however, consider current input and the output from a previous input, resulting in the recurrent neural network having a memory which captures information regarding the previous inputs in a sequence.

Neural networks are typically more efficient for training and deployment when they operate on fixed dimensional vectors. But, data used in some applications where a recurrent neural network would be useful are not easily represented as fixed dimensional vectors. For example, in language translation applications, input data sequences are of varying length because sequences—corresponding to phrases and sentences—vary in their number of words. As a result, data input to a recurrent neural network for translation would need to be trained using vectors of varying dimension as opposed to vectors of fixed dimension.

While training a recurrent neural network using vectors of varying dimension is possible, it can be inefficient for several reasons. First, a recurrent neural network trained using vectors of varying dimensions are inherently more complex (e.g., more hidden layers and/or neurons) than recurrent neural networks trained using fixed dimensional vectors. As a result, such recurrent neural networks can require significantly more resources—such as data, processing power, memory, and time—to train. And, once trained, such recurrent neural networks can require significantly more resources to process data. Second, since recurrent neural network trained using vectors of varying dimensions require several orders of magnitude more data for training, obtaining data corpuses large enough for training can be difficult. For example, for a translation application, it may be difficult to obtain a significant amount of English-French pairs of sequential data to train a translation recurrent neural network.

Accordingly, disclosed embodiments describe methods and systems for encoding sequential data, which might be traditionally represented as vectors of varying dimension, into a fixed dimensional vector representation. Disclosed embodiments also describe methods and systems for decoding fixed dimensional vector representations of sequential data from the fixed dimensional vector representation back to its sequential data form. By encoding sequential data into a fixed dimensional vector representation, a neural network can be trained to perform operations on sequential data using a data format that is more efficient for training and application purposes. Using the translation example above, for instance, English-French sentence pairs can be encoded into fixed dimensional vector representations and provided as input to a neural network to train the neural network to translate from English to French. Since this neural network trains on fixed dimensional vectors, training occurs faster and with less data that would be needed to train a recurrent neural network to perform the same operation using vectors of varying dimension.

In some embodiments, an encoder encoding sequential data into a fixed dimensional vector uses an encoding neural network, and a decoder decoding fixed dimensional vectors into sequential data uses a decoding neural network. The encoders and decoders are trained using sequential data from the same context. For example, an encoder and decoder for English would be trained using data from a corpus of English sentences and phrases while an encoder and decoder for French would be trained using data from a corpus of French sentences and phrases. As a result, the universe of corpuses that can be used to train encoders and decoders is larger than the universe of corpuses that can be used to train a recurrent neural network to translate English to French directly without encoding or decoding.

As described herein, in an example translation application translating from a first context (e.g., English) to a second context (e.g., French), three neural networks may be used. A first neural network may be used to encode sequential data of the first context into fixed dimensional vectors. A second neural network may be used to translate the fixed dimensional vectors corresponding to the first context to fixed dimensional vectors corresponding to the second context. A third neural network may be used to decode the translated, fixed dimensional vectors corresponding to the second context into sequential data of the second context. Although such an example translation application requires three neural networks, it is more efficient to train and use than a conventional recurrent neural network trained using vectors of varying length. This is so because in the example above, the processing time and complexity to train and operate the three neural networks is less than the processing time and complexity to train and operate the conventional neural network using vectors of varying length. In addition, it can be easier to train the three neural networks because significantly less data will be needed to train them as opposed to a conventional recurrent neural network that can translate from the first context to the second context.

FIG. 1 illustrates, in block form, system 100 for training recurrent encoders and decoders and for using recurrent encoders and decoders, consistent with disclosed embodiments. In the embodiment illustrated in FIG. 1, trainer computer system 110, training data sources 120, requester computer system 130 and provider computer system 140 can communicate using network 160.

System 100 outlined in FIG. 1 can be computerized, wherein each of the illustrated components comprises a computing device that is configured to communicate with other computing devices via network 160. For example, trainer computer system 110, training data sources 120, requester computer system 130 and provider computer system 140 can each include one or more computing devices, such as a desktop, notebook, or handheld computing device that is configured to transmit and receive data to/from other computing devices via network 160. Similarly, trainer computer system 110, training data sources 120, requester computer system 130, and provider computer system 140 can each include one or more computing devices that are configured to communicate data via the network 160. For example, trainer computer system 110, training data sources 120, requester computer system 130 and provider computer system 140 can include one or more servers or computing clusters. In some embodiments, these computing systems can be implemented using one or more computing devices dedicated to performing the respective operations of the systems as described herein.

According to some embodiments, system 100 can include trainer computer system 110. Trainer computer system 110 can perform functions and operations for training encoding neural networks and decoding neural networks consistent with disclosed embodiments. For example, trainer computer system 110 can perform functions and operations for training a neural network that can encode sequential data into a fixed dimensional vector representation of the sequential data. Likewise, trainer computer system 110 can perform functions and operations for training a neural network that can decode a fixed dimensional vector representation of sequential data into its corresponding sequential data form. Training computer system 110 can, in some embodiments, communicate with training data sources 120 to obtain data used for training an encoding neural network and a decoding network for a particular data context. For example, training computer system 110 can expose an application programming interface (API) that provides upload and/or acceptance of sequential training data for a context (e.g., text in a particular language, source code, sequential numerical data, or similar). In some embodiments, training computer system 110 can perform operations capable of collecting data from training data sources 120. For example, training computer system 110 can communicate with an API exposed by training data sources 120 to obtain training data. In some embodiments, training computer system 110 can request data objects (e.g., documents, images, or webpages) and can perform operations to extract training data from the request data objects. For example, training computer system 110 can request a webpage containing English text from training data source 120, and can then extract the English text from the HTML document it receives in response to the request. In some embodiments, training computer system 110 communicates with training data sources 120 via network 160.

In some embodiments, trainer computer system 110 can provide an encoding neural network (or an encoder, consistent with disclosed embodiments) and a decoding neural network (or decoder, consistent with disclosed embodiments) once it has trained them. The trained encoding neural network and trained decoding neural network can be provided via an API, a download, or through other data transfer mechanisms known within the art. In some embodiments, training computer system 110 provides the encoding neural network and the decoding neural network to provider computer system 140 via network 160.

System 100 can also include training data sources 120 in some embodiments. Training data sources 120 can include one or more data sources that provide training data to training computer system 110. In some embodiments, training data sources 120 can provide data in multiple contexts. For example, training data sources 120 may provide sequential language data—such as French text—in a first context and also provide sequential language data—such as English text—in the second context. Likewise, training data sources 120 may provide sequential language data in one context. Training data sources 120 can be specialized for the purpose of providing training data to training computer system 110 for training of encoders and decoders (which can each include a recurrent neural network) consistent with disclosed embodiments. For example, training data sources 120 can include text samples uploaded by a user of training data sources 120. In some embodiments, training data sources 120 can be any publicly accessible computer system that generally provides sequential data, but not necessarily for the purposes of training an encoder or a decoder. As just some examples, training data sources 120 can include websites, electronic books, reference materials, or open source code.

System 100 can also include requester computer system 130. Requester computer system 130 can include one or more computer systems that requests encoding or decoding of sequential data from another computer system, such as provider computer system 140. For example, requester computer system 130 may request that sequential data be encoded into a fixed dimensional vector representation by communicating the sequential data to provider computer system 140. Likewise, requester computer system 130 may request that a fixed dimensional vector be decoded to sequential data by communicating the fixed dimensional vector to provider computer system 140.

In some embodiments, requester computer system 130 can request one or more services that employ the use of an encoder or a decoder consistent with disclosed embodiments. For example, a user of requester computer system 130 may want to translate Russian text to Japanese text. The user of requester computer system 130 may input the Russian text to requester computer system 130. Requester computer system 130 may communicate the Russian text to a computer system that provides translation services from Russian to Japanese using a neural network trained to translate fixed dimensional vector representations of Russian text to fixed dimensional vector representations of Japanese text. In some embodiments, requester computer system 130 may provide a user interface so that users can request services from computer systems that employ the use of an encoder or decoder consistent with disclosed embodiments. For example, requester computer system 130 may provide a web browser displaying a webpage that provides user interface elements for a user to input Russian text.

In some embodiments, system 100 can also include provider computer system 140. Provider computer system 140 can perform functions and operations for encoding sequential data to fixed dimensional vector representations of the sequential data or decoding fixed dimensional vector representations of sequential data into the sequential data. In some embodiments, provider computer system 140 can provide services that make use of an encoder and/or decoder consistent with disclosed embodiments. For example, provider computer system 140 can provide translation services, denoising services, and/or classification services such as the ones described below with respect to FIGS. 6-8.

According to some embodiments, provider computer system 140 can receive requests for encoding, decoding and/or services from other computer systems such as requester computer system 130. In some embodiments, provider computer system 140 can provide user interfaces facilitating input of sequential data for encoding or for services. For example, provider computer system 140 can provide an HTTP service that provides webpages containing user interface elements for inputting sequential data, such as a text box for entering natural language text that is to be translated consistent with disclosed embodiments. In some embodiments, provider computer system 140 can expose an API that accepts sequential data as input and provides an encoded fixed dimensional vector representation of the sequential data as output. In some embodiments, the API can accept a fixed dimensional vector representation of sequential data as input and provide the sequential data (that has been decoded) as output. Similarly, provider computer system 140 can expose an API that accepts sequential source data as input and provide sequential target data as output. For example, provider computer system 140 can expose an API that accepts English text as input and provides German text as output. As another example, provider computer system 140 can provide an API that accepts sequential source data as input and provides a denoised version of sequential source data as output. In yet another example, provider computer system 140 can provide an API that accepts sequential source data as input and provides an indication (e.g., test, numeric value, data object) representing a classification of the sequential source data as output.

As mentioned above, system 100 can include network 160. Depending on the embodiment, network 160 can include one or more of any type of network, such as one or more local area networks, wide area networks, personal area networks, telephone networks, and/or the Internet, which can be accessed via any available wired and/or wireless communication protocols. For example, network 160 can comprise an Internet connection through which requester computer system 130 and provider computer system 140 communicate. Any other combination of networks, including secured and unsecured network communication links are contemplated for use in the systems described herein.

FIG. 2 shows an example training data flow 200 for training an encoder and decoder consistent with disclosed embodiments. According to some embodiments, training data flow 200 shows the data flow for training an encoder and decoder by training computer system 110. In FIG. 2, several data elements are labeled with numbers and lowercase letters a through d. For example, data elements sequential data 1, sequential data 2, sequential data 3, sequential data 4 are expressed using numerals followed by lowercase letters a through d. In the description that follows, these elements may be referred to by their grouping, as opposed to their lowercase letter specific identifiers for simplicity. For example, sequential data 1 205a, sequential data 2 205b, sequential data 3 205c, and sequential data 4 205d may be referred to collectively as sequential data 205. Also, while FIG. 2 shows data elements with a sequence length in sets of four, in some embodiments, data elements may flow through training data flow 200 in sets of less than or more than four. According to some embodiments the number of data elements can correspond to the sequence length that is processed by training computer system 110 at a time. For example, in the embodiment of FIG. 2, the sequence length is four.

Training data flow 200 begins with sequential data 205. As shown in the FIG. 2, sequential data 205 may comprise data elements data 1 205*a*, data 2 205*b*, data 3 205*c* and data 4 205*d*. In some embodiments, the data elements of sequential data 205 may correspond to an individual data unit of sequenced data. For example, when sequential data 205 is text, data 1 205*a*, data 2 205*b*, data 3 205*c* and data 4 205*d* may each correspond to a word. As another example, when sequential data 205 is numeric, data 1 205*a*, data 2 205*b*, data 3 205*c* and data 4 205*d* may each correspond to an individual numeric value. In some embodiments, to improve processing efficiency and training accuracy, before sequential data 205 is processed, the order of data 1 205*a*, data 2 205*b*, data 3 205*c* and data 4 205*d* may be reversed from their natural order in which data 1 205*a*, data 2 205*b*, data 3 205*c* and data 4 205*d* appear in a corpus from which sequential data 205 is derived. For example, sequential data 205 may correspond with "the boy jumped high." In this example, sequential data 205 may be processed in reverse order such that data 1 205*a* corresponds with "high," data 2 205*b* corresponds with "jumped," data 3 205*c* corresponds with "boy," and data 4 205*d* corresponds with "the."

As shown in FIG. 2, sequential data 205 may be provided to indexer 210. Indexer 210 may, in some embodiments, use a data structure that maps sequential data 205 to numerical indices corresponding to sequential data 205. For example, indexer 210 may include a hash map with key-value pairs where the keys are English words and the values are integers. In some embodiments, indexer 210 may include a fixed number of key-value pairs and may be limited by the most frequent keys within a data corpus from which sequential data 205 is derived. The most frequent keys can be defined by a number of most frequent words (e.g., the 10,000 most frequent words), or a certain percentage of most frequent words (e.g., top 15% most frequent words). In such embodiments, when any data elements of sequential data 205 is provided to indexer 210 for which indexer 210 does not have a key, indexer 210 may assign a special value corresponding to an unknown key. For example, when sequential data 205 is text data, and indexer 210 includes a hash map mapping key-value pairs for the most frequent 10,000 words of the data corpus from which sequential data 205 was derived, indexer 210 may assign the value 0 to data elements of sequential data 205 that does not correspond to one of the most frequent 10,000 words. Indexer 210 can output indices 215 where each index corresponds to a data element of sequential data 205. For example, indexer 210 may output index 1 215*a* for data 1 205*a*, index 2 215*b* for data 2 205*b*, index 3 215*c* for data c 205*c*, and index 4 215*d* for data 4 205*d*.

After sequential data 205 has been indexed by indexer 210, indices 215 are provided to embedding layer 220. In some embodiments, the embedding layer may be similar to the one described in T. Mikolov et al., "Distributed Representations of Words and Phrases and their Compositionality," Proceedings of NIPS (2013), which is incorporated by reference in its entirety (available at http://papers.nips.cc/paper/5021-distributed-representations-of-words-and-phrases-and-their-compositionality.pdf). Embedding layer 220, in some embodiments, assigns a vector of floating point values for indices 215. At initialization, the floating point values in the vectors can be randomly assigned and can be adjusted as training data flow 200 processes data to train encoding neural network 230 and decoding neural network 270. By using embedding layer 220, significantly more statements can be prepared for training encoding neural network 230 and decoding neural network 270 for a given vector dimensionality than in a "one-of-k" or a one-hot encoding scheme. In one-hot, each unique statement is represented with a vector including a total number of elements equaling the number of unique statements being encoded, wherein one of the elements is set to a one-value (or "hot") and the remaining elements are set to zero-value. For example, for a 256-dimension vector, 256 statements (including the unknown statement vector) can be represented using one-hot encoding, but using an embedding layer can result in tens of thousands of statement representations. While some embodiments of training data flow 200 have an embedding layer 220, some embodiments may create vectors from indices 215 using a one-of-k or one-hot encoding scheme.

In some embodiments, once the indices 215 have been processed by embedding layer 220, embedding layer 220 may output encoding trainer input vector set 225 that includes input vector 1 225*a*, input vector 2 225*b*, input vector 3 225*c*, and input vector 4 225*d*, for example. Input vector 1 225*a*, input vector 2 225*b*, input vector 3 225*c*, and input vector 4 225*d* may correspond to index 1 215*a*, index 2 215*b*, index 3 215*c*, and index 4 215*d* respectfully. Encoding trainer input vector set 225 may be provided to encoding neural network 230. Encoding neural network 230 may be a neural network that is being trained to produce an output (e.g., encoding-trainer output vector set 235) that matches the encoding trainer input vector set. Encoding neural network 230 may include several nodes 232 each representing a set of neurons corresponding to the dimensionality of the input vectors of encoding trainer input vector set 225. For example, if the dimensionality of the vectors within encoding trainer input vector set 225 is 256, then node 232 may include 256 neurons corresponding to each element of the vectors of encoding trainer input vector set 225.

Figure 3:
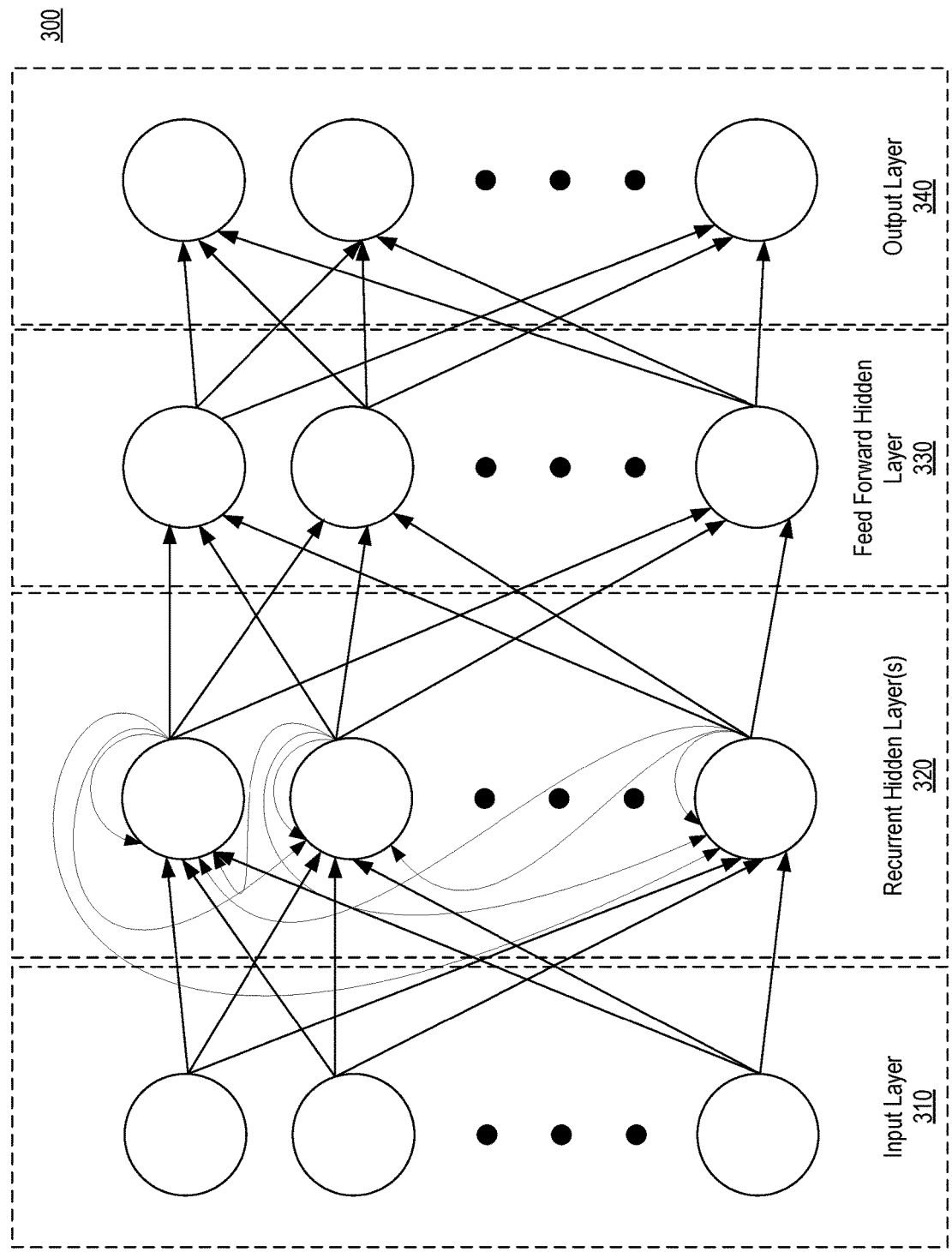
FIG. 3 shows an example recurrent neural network architecture consistent with embodiments of the present disclosure.

In some embodiments, encoding neural network employs recurrent neural network architecture 300, shown in FIG. 3. Recurrent neural network architecture 300 can include multiple layers, but as one example the embodiment shown in FIG. 3 includes four layers, input layer 310, recurrent hidden layer 320, feed forward layer 330, and output layer 340. Recurrent neural network architecture 300 is fully connected for input layer 310, recurrent hidden layer 320, and feed forward layer 330. Recurrent hidden layer 320 can also be fully connected with itself. In this manner, as encoding recurrent neural network 230 is trained over a series of time steps, the output of recurrent hidden layer 320 for time step t is applied to the neurons of recurrent hidden layer 320 for time step t+1.

While FIG. 3 illustrates input layer 310 including three neurons, the number of neurons is variable, as indicated by the " . . . " between the second and third neurons of input layer 310 shown in FIG. 3. According to some embodiments, the number of neurons in input layer 310 corresponds to the dimensionality of the vectors of encoding trainer input vector set.

According to some embodiments, the activation function for the neurons of recurrent neural network architecture 300 can include, but are not limited to, Tan H or Sigmoid. Recurrent neural network architecture 300 can also include a cost function, which in some embodiments, is a binary cross entropy function. Recurrent neural network architecture 300 can also use an optimizer, which can include, but is not limited to, an Adam optimizer in some embodiments (see, e.g., D. Kingma and J. Ba, "Adam: A Method for Stochastic Optimization," 3rd International Conference for Learning Representations, San Diego, 2015, and Y. Gal, "A Theoretically Grounded Application of Dropout in Recurrent Neural Networks," arXiv:1512.05287 [stat.ML], available at http://arxiv.org/abs/1512.05287, which are both incorporated by reference herein in their entirety). In some embodiments, recurrent neural network architecture 300 uses a method called dropout to reduce overfitting due to sampling noise within training data (see, e.g., N. Srivastava et al., "Dropout: A Simple Way to Prevent Neural Networks From Overfitting," Journal of Machine Learning Research, Vol. 15, pp. 1929-1958, 2014, incorporated by reference herein in its entirety). For recurrent neural network architecture 300, a dropout value of 0.4 can be applied between recurrent hidden layer 320 and feed forward layer 330 to reduce overfitting.

Although in some embodiments encoding recurrent neural network 230 is trained using recurrent neural network architecture 300 with the parameters described above, encoding recurrent neural network 230 can be trained using different neural network architectures without departing from the spirit and scope of the present disclosure.

Returning to FIG. 2, encoding neural network 230 may output encoding-trainer output vector set to 35 that includes output 1 235a, output 2 235b, output 3 235c, and output 4 235d, for example. Encoding-trainer output vector set 235 may be provided to selector 240 which selects one vector of encoding training output vector set 235 as encoding vector 245. In some embodiments, selector 240 may select a vector at random. In some embodiments, selector 240 may select the last vector (e.g. output 4 235d) as encoding vector 245, or any other vector of encoding-trainer output vector set 235.

After selector 240 has selected the encoding vector 245 it is provided to repeat layer 250. Repeat layer 250 copies encoding vector 245 a sufficient number of times to match the sequence length. For example, as shown in FIG. 2, repeat layer 250 copies encoding vector 245 four times since the sequence length is four.

Once repeat layer 250 copies encoding vector 245, repeat layer 250 provides the copies of encoding vector 245 to concatenator 260 which concatenates encoding vector 245 with the vectors of encoding trainer input vector set 225 corresponding to the non-selected vectors of encoding-trainer output vector set 235 and another vector representing a beginning of sequence indicator. In some embodiments, training data flow 200 uses embedding layer 220 to create a beginning of sequence vector 258 indicating the beginning of a sequence. Embedding layer 220 may also provide embeddings for the vectors of encoding trainer input vector set 225 corresponding to the non-selected vectors of encoding-trainer output vector set, as shown in FIG. 2.

For example, selector 240 may choose the last vector of encoding-trainer output vector set 235—output 4 235d—as encoding vector 245. In this example, output 1 235a, output 2 235b, and output 3 235c are the non-selected vectors of encoding-trainer output vector set 235. The corresponding vectors for the non-selected vectors of encoding-trainer output vector set 235 would be input 1 225a, input 2 225b, and input 3 225c in this example. Concatenator 260 may concatenate encoding vector 245 with beginning of sequence vector 258, encoding vector 245 with input 1 225a, encoding vector 245 with input 2 225b, and encoding vector 245 with input 3 225c. This results in concatenator 260 outputting decoding trainer input vector set 265 which may include concatenated vector 1 265a, concatenated vector 2 265b, concatenated vector 3 265c, and concatenated vector 4 265d. In this example, concatenated vector 1 265a is the concatenation of encoding vector 245 with beginning of sequence vector 258, concatenated vector 2 265b is the concatenation of encoding vector 245 with input 1 225a, and concatenated vector 3 265c is the concatenation of encoding vector 245 with input 3 225c, which together form decoding trainer input vector set 265.

In some embodiments, decoding trainer input vector set 265 is used to train decoding neural network 270. Decoding neural network 270 can include an architecture similar to encoding neural network 230 as described above and also as described with respect to FIG. 3. Decoding neural network 270 may output decoding trainer output vector set 275 which can include decode vector 1 275a, decode vector 2 275b, decode vector 3 275c, and decode vector 4 275d. Output decoding trainer output vector set 275 may be provided to summing layer 280, in some embodiments. Summing layer 280 may sum corresponding elements of decoding trainer output vector set 275 with the elements of encoding trainer input vector set 225 (which may, in some embodiments, be provided by embedding layer 220 to summing layer 280 as shown in FIG. 2) to create target vector set 290. For example, summing layer 280 may sum decode vector 1 275a with input vector 1 225a to generate target vector 1 280a, decode vector 2 275b with input vector 2 225b to generate target vector 2 280b, decode vector 3 275c with input vector 3 225c to generate target vector 3 280c, and decode vector 4 275d with input vector 4 225d to generate target vector 4 280d. In some embodiments, decoding neural network 270 is trained such that target vector set 290 includes vectors with elements of zero value, or stated another way, decoding neural network 270 is trained such that decoding trainer output vector set 275 is the additive inverse of encoding trainer input vector set 225.

In some embodiments, training data flow 200 may be performed for numerous iterations until encoding neural network 230 is trained to output encoding-trainer output vector set to be the same as encoding trainer input vector set and decoding neural network 270 is trained such that decoding trainer output vector set 275 when applied to summing layer 280 produces target vector set 290 consistent with goals of training. For example, training data flow 200 may be performed until target vector set 290 is the same as encoding trainer input vector set 225, the additive inverse of encoding trainer input vector set 225, or results in vectors with elements of zero value. Once encoding neural network 230 and decoding neural network 270 have been trained to satisfy the training parameters of their respective neural networks and the parameters of training data flow 200, they can be respectfully used in a recurrent encoder and a recurrent decoder as described in FIG. 4 and FIG. 5.

Figure 4:
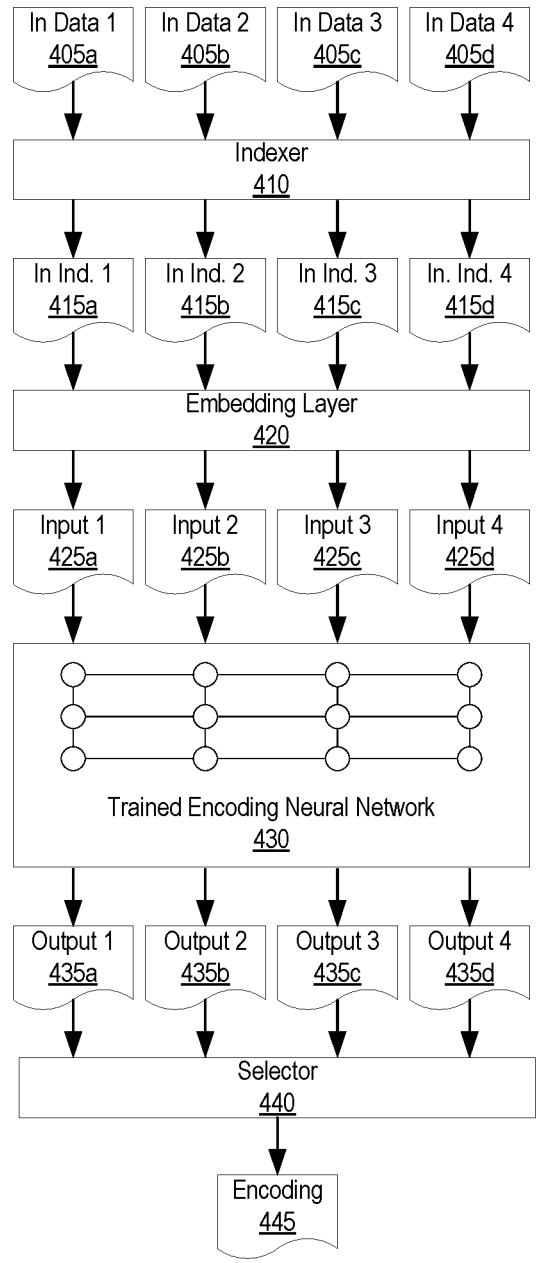
FIG. 4 shows an example data flow for an encoder consistent with disclosed embodiments.

FIG. 4 shows an example encoding data flow 400 that may be used by a recurrent encoder consistent with disclosed embodiments. In some embodiments, encoding data flow 400 may be performed by a computer system, such as provider computer system 140, executing a recurrent encoder that has been trained using training data flow 200, for example. As shown in FIG. 4, encoding data flow 400 may utilize trained encoding neural network 430. Trained encoding neural network 430 may be a neural network that has been trained to produce a vector set from which a fixed dimensional vector may be selected that represents sequential data. In the example of FIG. 4, training encoding neural network 430 has been trained to generate a fixed dimensional vector representation of sequential data in the same context as sequential data set 405 (shown as in data 1 405*a*, in data 2 405*b*, in data 3 405, and in data 4 405*d*). For example, if sequential data set 405 corresponds to French natural language text, trained encoding neural network 430 may have been trained (using training data flow 200) to encode a sequence of French text to a fixed dimensional vector representation using a data corpus of French text.

In some embodiments, encoding data flow 400 uses indexer 410 and embedding layer 420, which may the same as indexer 210 and embedding layer 220 used to train trained encoding neural network 430. Encoding data flow 400 can also include selector 440, which can be configured to select encoding vector 445 using a method consistent with how selector 240 selects encoding vector 245 while training trained encoding neural network 430. For example, if selector 240 selects the last vector of encoding-trainer output vector set 235 (e.g., output vector 4 235*d*) as encoding vector 245, selector 440 will select the last vector (e.g., output 4 435*d*) of encoded output vector set 435 as encoding vector 445.

In some embodiments, encoding data flow 400 performs substantially the same operations as training data flow 200 up to the point where selector 240 selects encoding vector 245 with one significant difference—in training data flow 200 encoding neural network 230 is in the process of being trained while in encoding data flow 400, trained encoding neural network 430 has already been trained (e.g., according to training data flow 200). Accordingly, sequential data set 405 can be provided as input to indexer 410. Indexer 410 can produce input indices 415 and provide them to embedding layer 420. Embedding layer 420 can produce input vector data set 425 which is then fed to trained encoding neural network 430. Encoding neural network 430 produces output vector data set 435 and provides it to selector 440, which selects one vector of output vector data set 435 as encoding vector 445 consistent with disclosed embodiments.

As encoding data flow 400 can be substantially similar to the first half of training data flow 200, decoding data flow 500, shown in the FIGS. 5A-5D can be substantially similar in architecture to the second half of training data flow 200—from the point in training data flow 200 where encoding vector 245 is provided to repeat layer 250. However, decoding data flow 500 differs from training data flow 200 because training data flow 200 relies on encoding trainer input vector set 225 to train decoding neural network 270, which is not known when performing decoding data flow. Stated differently, decoding neural network 270 is trained with knowledge of the source sequential data that it is being trained to decode. In practice however, decoding neural network 570 would not know the sequential data that has been encoded or its vector set representation. Accordingly, decoding data flow 500, in some embodiments, performs an iterative process whereby one vector corresponding to encoded sequential data is determined per iteration. As the beginning of sequence vector was used during training to indicate a beginning of sequence, it can be used as the first known vector when decoding.

FIGS. 5A-5D shows an example decoding data flow 500 that may be used by a recurrent decoder consistent with disclosed embodiments. In some embodiments, decoding data flow 500 may be performed by a computer system, such as provider computer system 140, executing a recurrent decoder that has been trained using training data flow 200, for example. As shown in FIGS. 5A-5D, decoding data flow 500 may utilize trained decoding neural network 570. Trained decoding neural network 570 may be a neural network that has been trained to produce a vector set corresponding to sequential data encoded as encoding vector 545, a fixed dimensional vector. In the example of FIGS. 5A-5D, trained decoding neural network 570 has been trained to generate a decoded output vector set 575 (shown in FIG. 5D) corresponding to sequential data of a same context that was used to train the encoder that produced encoding vector 545. For example, if encoding vector 545 was produced by an encoder trained with French natural language text, trained decoding neural network 570 may generate French text corresponding to encoding vector 545. In some embodiments, trained decoding neural network 570 is trained concurrently with the encoder that generated encoding vector 545. For example, trained decoding neural network 570 and the encoder that generated encoding vector 545 may be been trained using training data flow 200.

Although FIGS. 5A-5D describe an embodiment of decoding data flow 500 that includes four processing iterations, the number of iterations performed by decoding data flow 500 may vary from embodiment to embodiment. In some embodiments, decoding data flow 500 performs a number of iterations consistent with the sequence length used to train trained decoding neural network 570. For example, in the embodiment of FIGS. 5A-5D, decoding data flow 500 performs four iterations because the sequence length is four. But, if the sequence length were six, then decoding data flow 500 may perform six iterations, in a pattern similar to the one described below, to decode encoding vector 545.

Figure 5A:
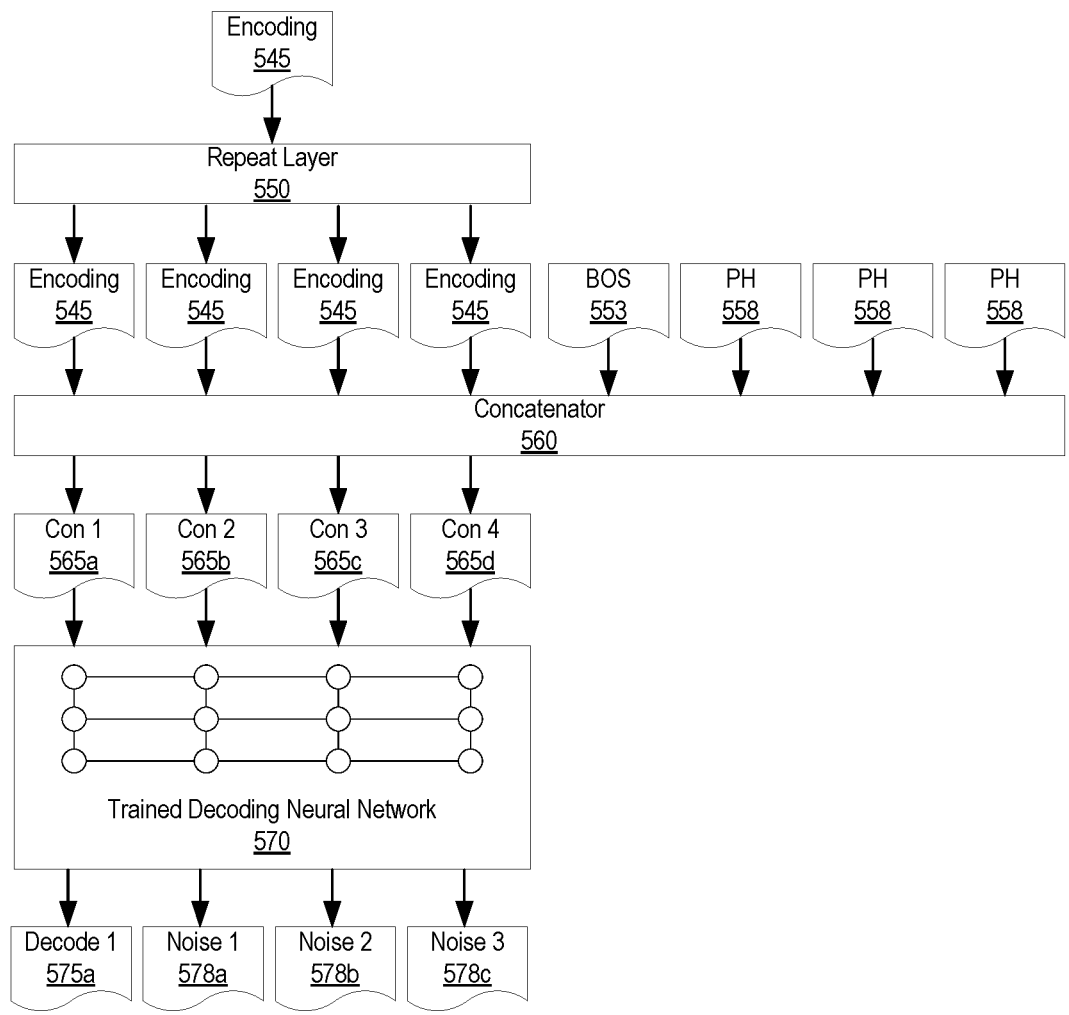
FIGS. 5A-5D show an example data flow for a decoder consistent with disclosed embodiments.

FIG. 5A shows an example first iteration of decoding data flow 500. Encoding vector 545 may represent a fixed dimensional vector representation of sequential data. Repeat layer 550 may perform functions and operations substantially similar to repeat layer 250 described above with respect to FIG. 2. In the first iteration of decoding data flow 500 shown in FIG. 5A, repeat layer 550 may copy encoding vector 545 a sequence length number of times and provide the copies to concatenator 560. Concatenator 560 may concatenate each copy of the encoding vector 545 with another vector to form concatenated input vector set 565 (which can include concatenated vector 1 565*a*, concatenated vector 2 565*b*, concatenated vector 3 565*c*, and concatenated vector 4 565*d*). In some embodiments, concatenated 560 concatenates encoding vector 545 with beginning of sequence vector 553 to create concatenated vector 1 565*a*. In some embodiments, the beginning of sequence vector 553 is the same beginning of sequence vector use to train trained decoding neural network 570. In the first iteration of decoding data flow 500, concatenator 560 concatenates encoding vector 545 with placeholder vector 558 to create concatenated vector 2 565*b*, concatenated vector 3 565*c*, and concatenated vector 4 565*d*. In some embodiments, placeholder vector 558 may include elements corresponding to values indicating that placeholder vector 558 does not correspond with data from the same context as the sequential data used to train trained decoding neural network 570. For example, placeholder vector 558 may include all elements with the same value such as 1, 0, or 256 as just some examples.

Once concatenated input vector set 565 has been generated, it is provided to trained decoding neural network 570. Trained decoding neural network 570 may output decoded output vector set 578, which may include decode vector 1 575*a* in the first position, corresponding to the concatenation of encoding vector 545 and beginning of sequence vector 553. Decoded output vector set 578 may also include three vectors of noise corresponding to the concatenation of encoding vector 545 and placeholder vector 558 (represented as noise vector 1 578*a*, noise vector 2 578*b*, noise vector 3 578c in FIG. 5A). Once trained decoding neural network 570 outputs decoded output vector set 578, the first iteration is complete and processing of decoding data flow 500 continues in FIG. 5B.

Figure 5B:
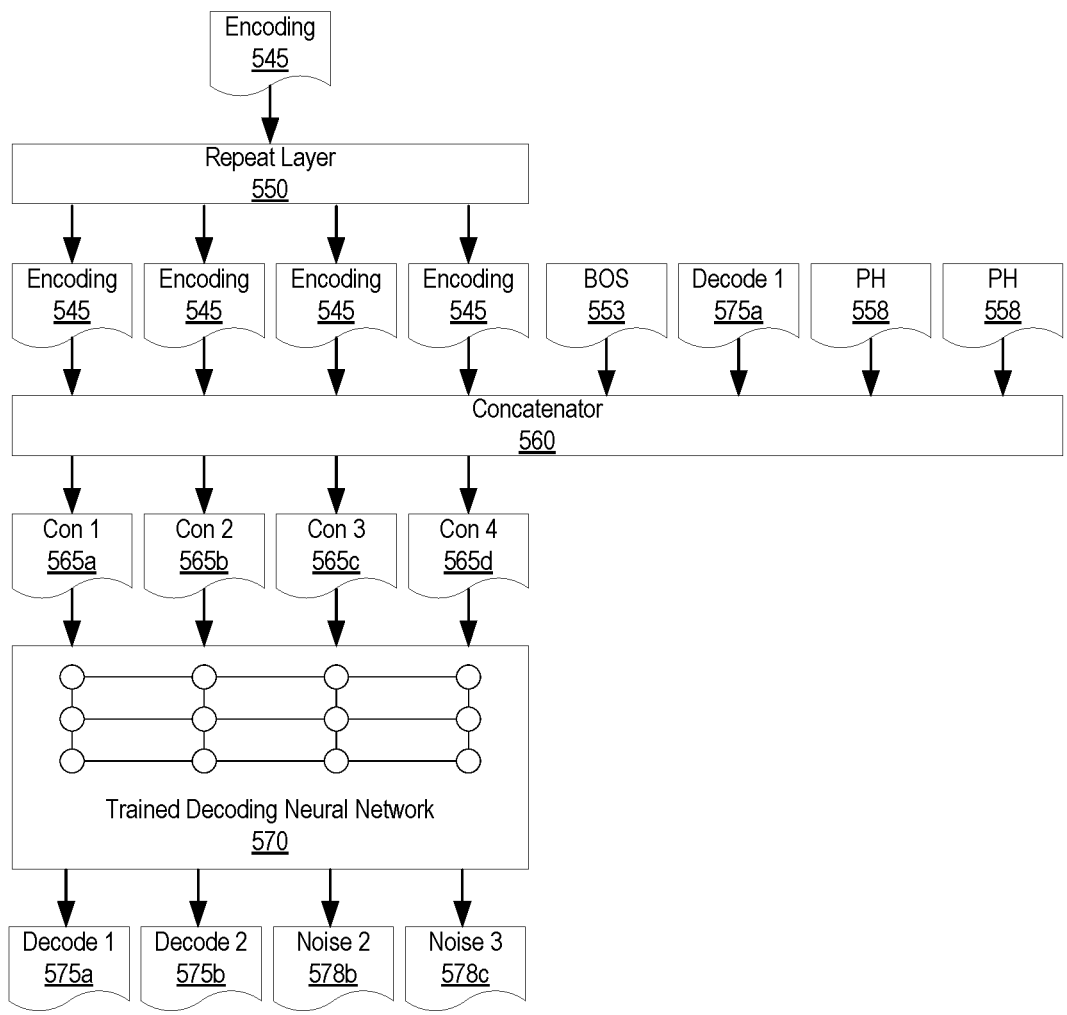

The second iteration of decoding data flow 500, shown in FIG. 5B, is similar to the first iteration, but concatenator 560 concatenates encoding vector 545 with different vectors than in the first iteration. According to some embodiments, in the second iteration, concatenator 560 concatenates beginning of sequence vector 553 with encoding vector 545 to create concatenated vector 1 565a, as was the case in the first iteration shown in FIG. 5A. Concatenator 560 concatenates decode vector 1 575a (which was part of decoded output vector set 578 in the first iteration) with encoding vector 545 to create concatenated vector 2 565b. And, concatenator 560 concatenates encoding vector 545 with placeholder vector 558 to create concatenated vector 3 565c and concatenated vector 2 565d, like the first iteration. The second iteration proceeds similar to the first iteration where trained decoding neural network 570 receives concatenated input vector set 565 as input and produces decoded output vector set 578. In some embodiments, in the second iteration, decoded output vector set 578 may include decode vector 1 575a in the first position and decode vector 2 575b in the second position, corresponding to the concatenation of encoding vector 545 and beginning of sequence vector 553 (for decode vector 1 575a) and the concatenation of encoding vector 545 and decode vector 1 575a (for decode vector 2 575b). In the second iteration, decoded output vector set 578 may also include two vectors of noise corresponding to the concatenation of encoding vector 545 and placeholder vector 558 (represented as noise vector 2 578b, noise vector 3 578c in FIG. 5B). Once trained decoding neural network 570 outputs decoded output vector set 578, the second iteration is complete and processing of decoding data flow 500 continues in FIG. 5C.

Figure 5C:
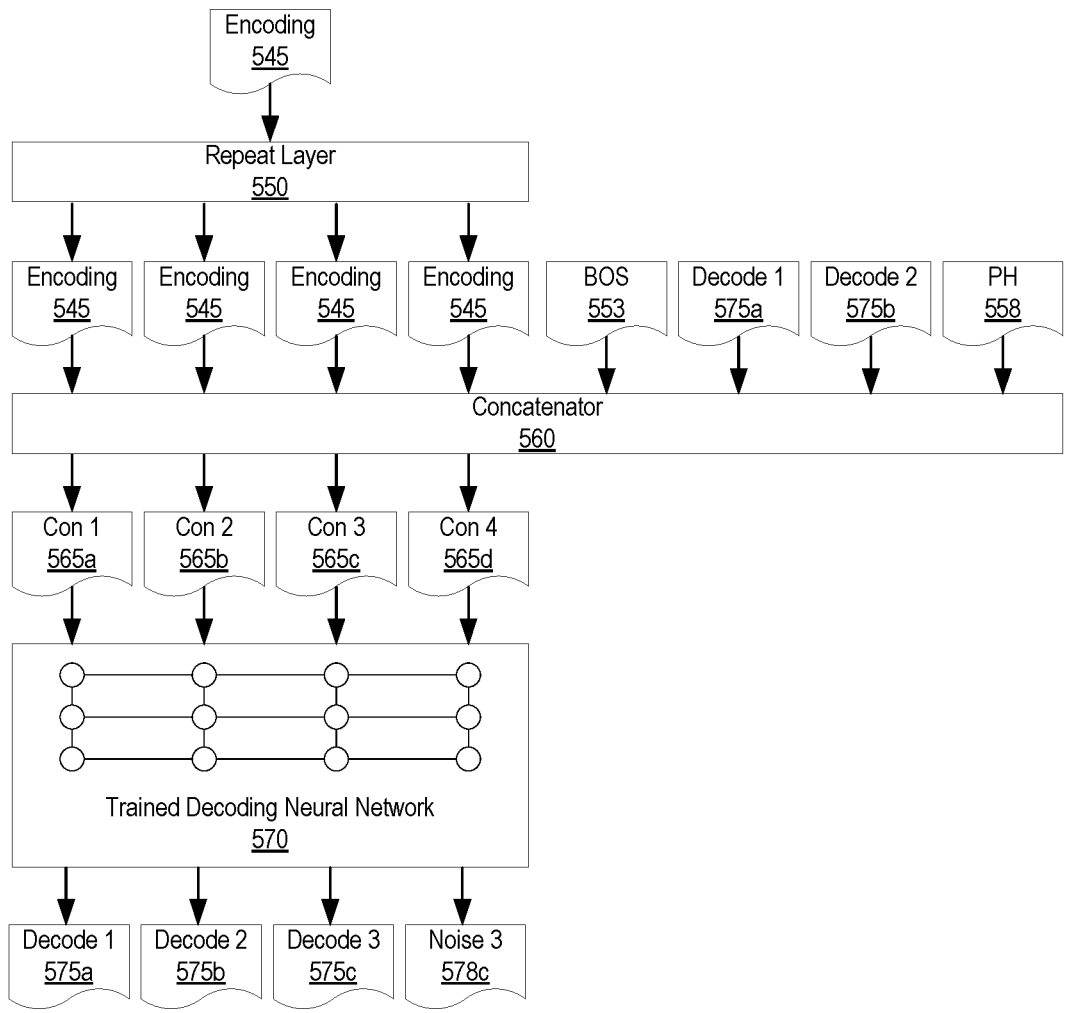

The third iteration of decoding data flow 500, shown in FIG. 5C, is similar to the first and second iterations, but concatenator 560 concatenates encoding vector 545 with different vectors than in the first and second iterations. According to some embodiments, in the third iteration, concatenator 560 concatenates beginning of sequence vector 553 with encoding vector 545 to create concatenated vector 1 565a, as was the case in the first and second iterations shown in FIGS. 5A and 5B. Concatenator 560 may also concatenate decode vector 1 575a (which was part of decoded output vector set 578 in the first iteration) with encoding vector 545 to create concatenated vector 2 565b and concatenate decode vector 2 575b (which was part of decoded output vector set 578 in the second iteration) with encoding vector 545 to create concatenated vector 3 565c. And, concatenator 560 also concatenates encoding vector 545 with placeholder vector 558 to create concatenated vector 4 565d. The third iteration proceeds similar to the first and second iterations where trained decoding neural network 570 receives concatenated input vector set 565 as input and produces decoded output vector set 578. In some embodiments, in the third iteration, decoded output vector set 578 may include decode vector 1 575a in the first position, decode vector 2 575b in the second position, and decode vector 3 575c in the third position, corresponding to the concatenation of encoding vector 545 and beginning of sequence vector 553 (for decode vector 1 575a), the concatenation of encoding vector 545 and decode vector 1 575a (for decode vector 2 575b), and the concatenation of encoding vector 545 and decode vector 2 575b (for decode vector 3 575c). In the third iteration, decoded output vector set 578 may also include a vector of noise corresponding to the concatenation of encoding vector 545 and placeholder vector 558 (represented as noise vector 3 578c in FIG. 5C). Once trained decoding neural network 570 outputs decoded output vector set 578, the second iteration is complete and processing of decoding data flow 500 continues in FIG. 5D.

Figure 5D:
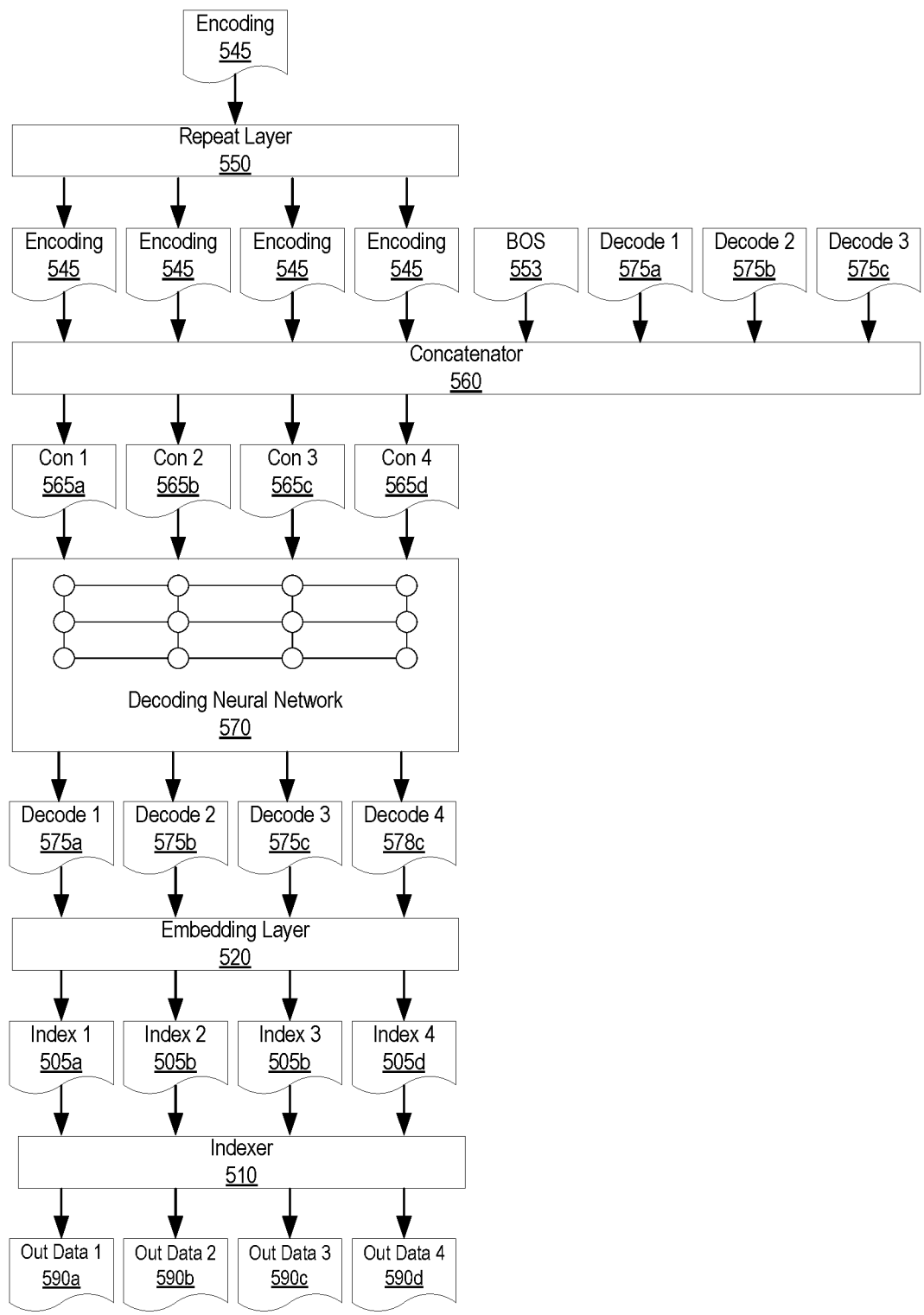

The fourth iteration of decoding data flow 500, shown in FIG. 5D, is similar to the first, second, and third iterations, but concatenator 560 concatenates encoding vector 545 with different vectors than in the first, second, and third iterations. According to some embodiments, in the fourth iteration, concatenator 560 concatenates beginning of sequence vector 553 with encoding vector 545 to create concatenated vector 1 565a, as was the case in the first, second and third iterations shown in FIGS. 5A-5C. Concatenator 560 may also concatenate decode vector 1 575a (which was part of decoded output vector set 578 in the first iteration) with encoding vector 545 to create concatenated vector 2 565b, concatenate decode vector 2 575b (which was part of decoded output vector set 578 in the second iteration) with encoding vector 545 to create concatenated vector 3 565c, and concatenate decode vector 3 575c (which was part of decoded output vector set 578 in the third iteration) with encoding vector 545 to create concatenated vector 4 565d. Unlike the first, second, and third iterations however, concatenator 560 does not concatenate encoding vector 545 with placeholder vector 558. The fourth iteration proceeds similar to the first, second, and third iterations where trained decoding neural network 570 receives concatenated input vector set 565 as input and produces decoded output vector set 578. In some embodiments, in the fourth iteration, decoded output vector set 578 may include decode vector 1 575a in the first position, decode vector 2 575b in the second position, decode vector 3 575c in the third position, and decode vector 4 575c in the fourth position corresponding to the concatenation of encoding vector 545 and beginning of sequence vector 553 (for decode vector 1 575a), the concatenation of encoding vector 545 and decode vector 1 575a (for decode vector 2 575b), the concatenation of encoding vector 545 and decode vector 2 575b (for decode vector 3 575c), and the concatenation of encoding vector 545 and decode vector 3 575c (for decode vector 4 575d). In the fourth iteration, unlike the first, second, and third iterations, decoded output vector set 578 does not include a vector of noise because there was no concatenation of encoding vector 545 and placeholder vector 558 in the fourth iteration.

In some embodiments, once trained decoding neural network 570 outputs decoded output vector set 578 in the fourth iteration, embedding layer 520 determine indices 505 corresponding to sequential data. Embedding layer 520 may be the same embedding layer (e.g., embedding layer 220) used in the training data flow (e.g., training data flow 200) used to train trained decoding neural network 570. After embedding layer 520 outputs indices 505, indices 505 may be provided to indexer 510 to correlate indices 505 with output data 590, which is the decoded sequential data corresponding to fixed dimensional encoding vector 545.

Figure 6:
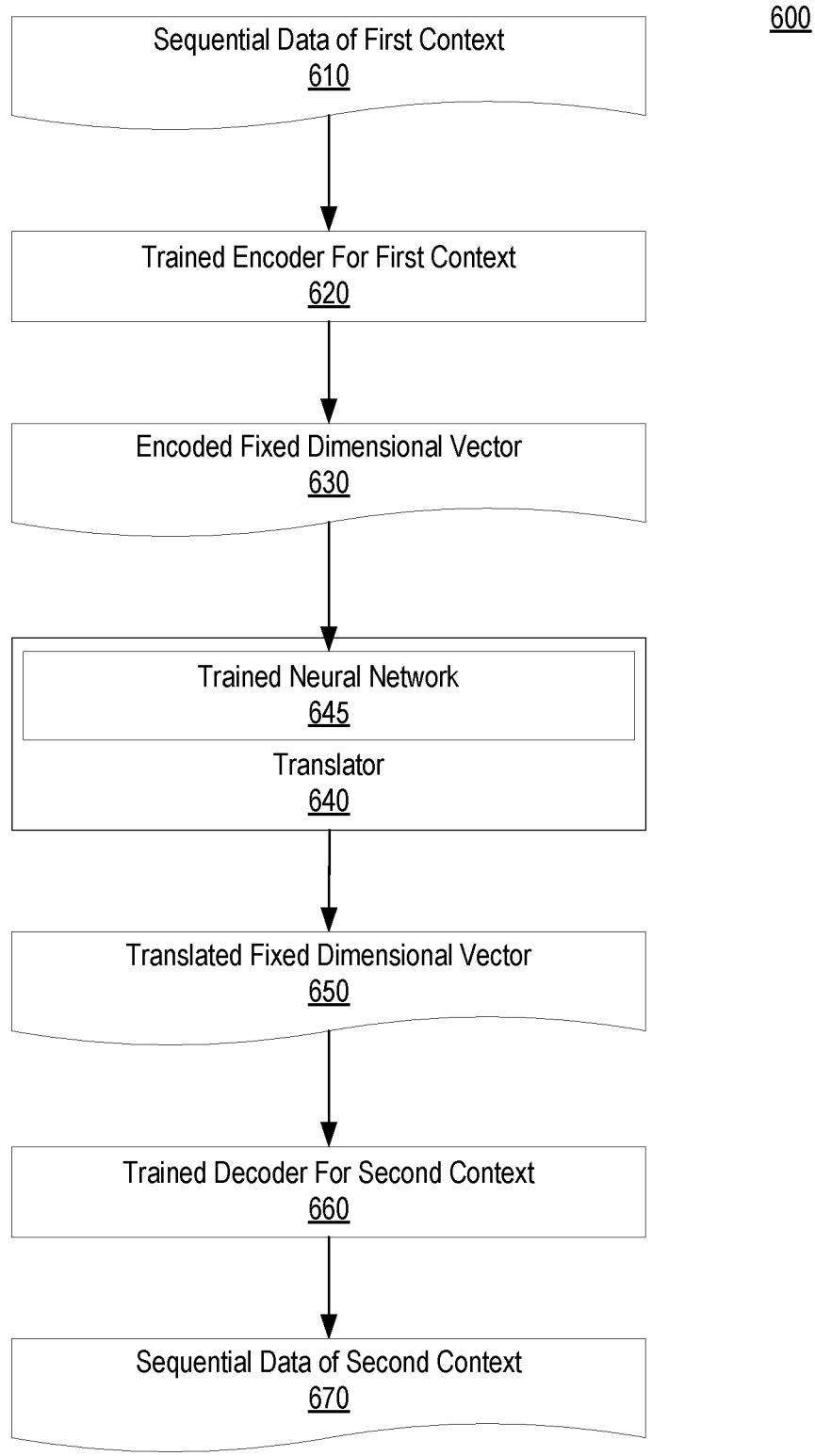
FIG. 6 shows a data flow for a translator architecture consistent with disclosed embodiments.
Figure 7:
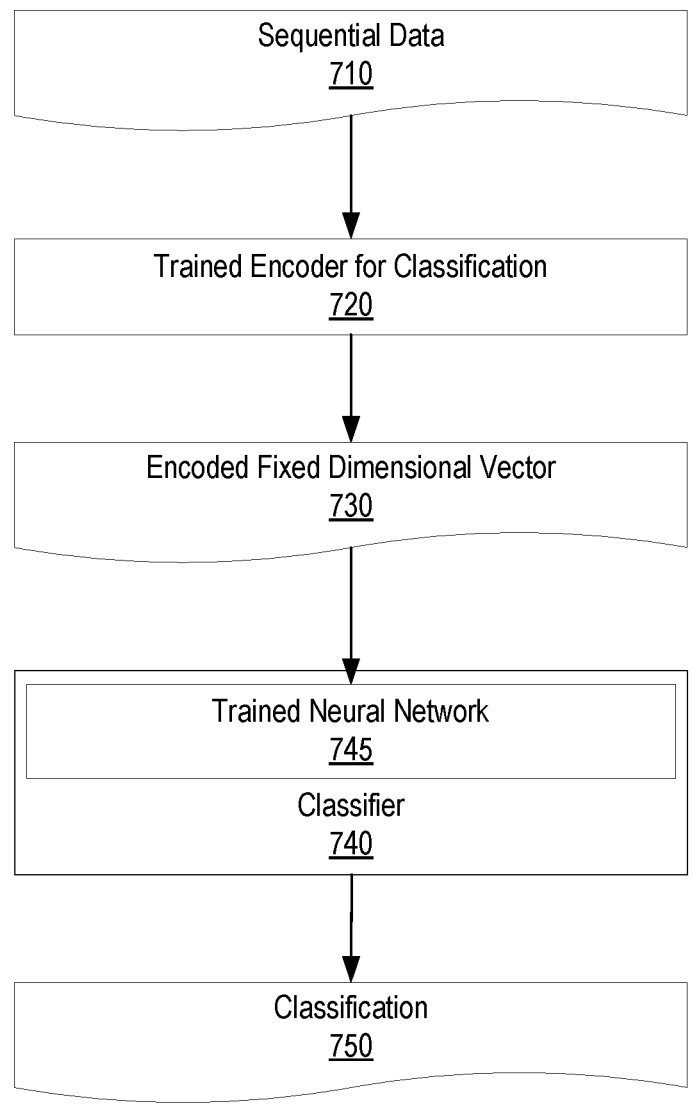
FIG. 7 shows a data flow for a classification architecture consistent with disclosed embodiments.
Figure 8:
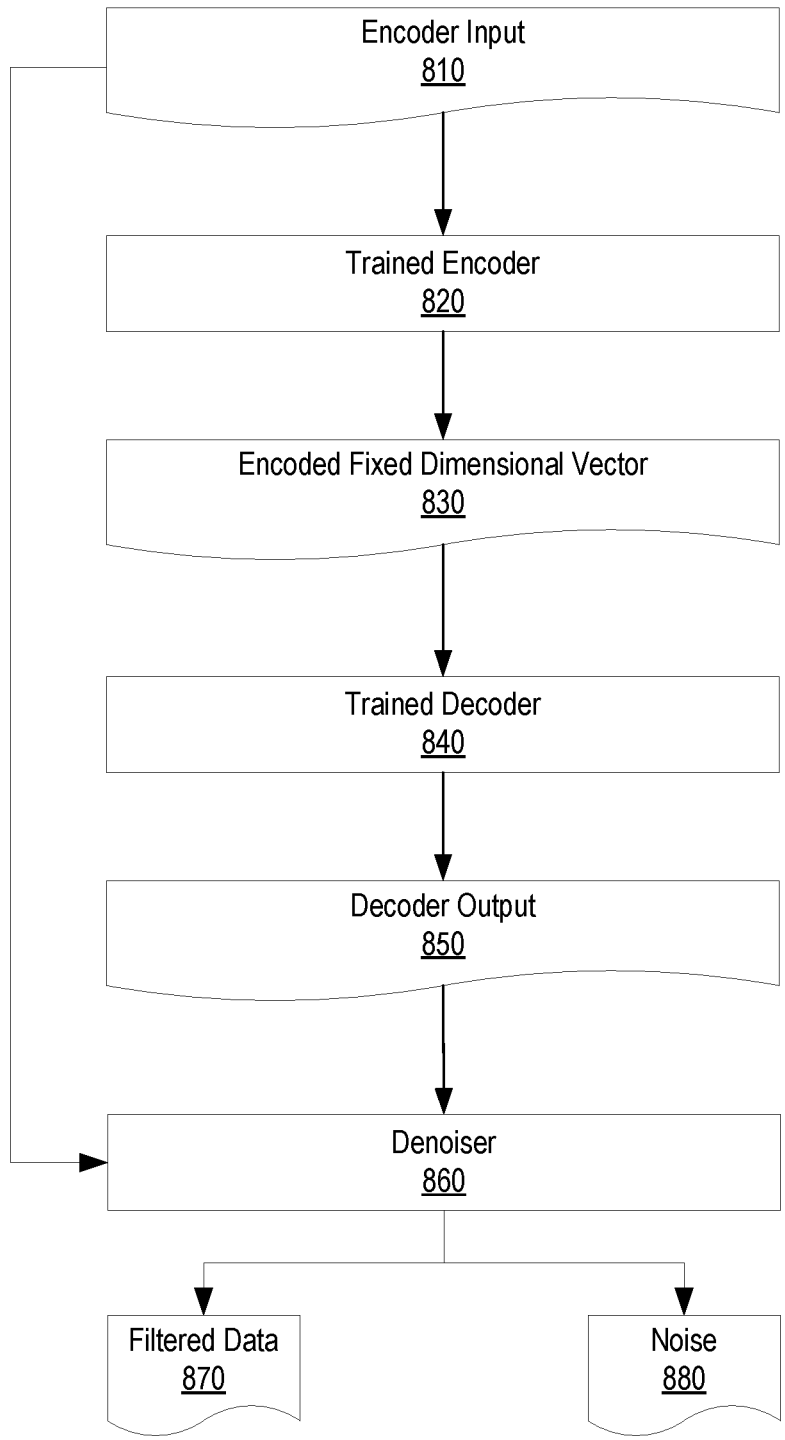
FIG. 8 shows a data flow for a denoising architecture consistent with disclosed embodiments.

The recurrent encoders and decoders disclosed herein may be deployed in a variety of applications. FIGS. 6-8 describe three application architectures in which disclosed recurrent encoders and decoders may be deployed: a translation architecture, a classification architecture, and a denoising architecture. In some embodiments, one or more computer systems can be configured to perform operations consistent with the application architectures described in FIGS. 6-8. For example, provider computer system 140 may be configured to perform operations described below with respect to FIGS. 6-8. Although FIGS. 6-8 describe certain application architectures that may use disclosed recurrent encoders and decoders, use of disclosed recurrent encoders and decoders are not limited to the below described application architectures.

FIG. 6 shows translation architecture data flow 600, which describes the data flow and architecture for one embodiment one embodiment of a translation application utilizing disclose recurrent encoders and decoders. In an example translation architecture, sequential data of a first context can be encoded as a fixed dimensional vector, translated to a fixed dimensional vector corresponding to a second context, and then decoded to sequential data of the second context.

In translation architecture data flow 600, sequential data 610 of a first context is input to trained encoder 620 for the first context. The first context may be a context associated with a language, an encryption scheme, programming language, or any other communication format having sequential data, syntax, or grammar. For example, the first context may correspond to English. Likewise, the second context may be a context associated with a language, simple encryption scheme, programming language, or any other communication format having sequential data, syntax, or grammar. For example, the second context may correspond to Spanish.

Trained encoder 620 can be an encoder that has been trained consistent with disclosed embodiments (e.g., trained data flow 200) for generating a fixed dimensional vector representation of sequential data of the first context. For example, training encoder 620 can be trained using English textual data.

After trained encoder 620 generates encoded fixed dimensional vector 630, encoded fixed dimensional vector 630 may be provided as input to translator 640. In some embodiments, translator 640 can perform operations to translate a first fixed dimensional vector of a first context to second fixed dimensional vector of a second context. Translator 640 can include, for example, trained neural network 645.

In some embodiments, translator 640 outputs translated fixed dimensional vector 650, which is a fixed dimensional vector corresponding to sequential data of the second context. Translated fixed dimensional vector 650 may be provided as input to trained decoder 660 for the second context. In some embodiments, trained decoder 660 can be a decoder that has been trained consistent with disclosed embodiments (e.g., trained data flow 200) for generating sequential data of a second context from a fixed dimensional vector representation of that sequential data. For example, trained decoder 660 may have been trained using French textual data. Once trained decoder 660 receives translated fixed dimensional vector 650 as input it may process it to generate sequential data 670 of the second context consistent with disclosed embodiments.

FIG. 7 shows classification architecture data flow 700, which describes the data flow and architecture for one embodiment of a classification application utilizing disclosed recurrent encoders and decoders. In an example classification architecture, sequential data that is to be classified can be encoded as a fixed dimensional vector and provided to a classifier. The classifier may use a neural network that has been trained to classify sequential data into a plurality of categories. For example, the neural network of the classifier may be trained to detect defects in source code, grammatical errors in natural languages (e.g., English or French), errors in images, or detect errors in numerical sequences. In these examples, the classifier may classify sequential data into two categories—sequential data with errors and those without. In another example, classifier classify sequential data into more than two categories. For example, the neural network of the classifier may be trained to identify a type of source code error, a type of grammatical error natural languages, a type of error in numerical sequences, or to identify a classification for an image sequence.

In classification architecture data flow 700, trained encoder 720 may be provided with sequential data 710. Trained encoder 720 can be an encoder that has been trained consistent with disclosed embodiments (e.g., trained data flow 200) for generating a fixed dimensional vector representation of sequential data that is of the same context as sequential data 710. For example, training coder 720 can be trained using source code, natural language text, or numerical sequences. After training encoder 720 receives sequential data 710, it may generate encoded fixed dimensional vector 730, which is a fixed dimensional vector corresponding to sequential data 710 consistent with disclosed embodiments.

In some embodiments, classifier 740 may receive as input encoded fixed dimensional vector 730 and process it using trained neural networks 745. Trained neural networks 745, in some embodiments, may have been trained using encoded fixed dimensional vectors corresponding to sequential data that is of the same context as sequential data 710. In addition, trained neural network 745 may also have been trained to classify fixed dimensional vectors corresponding to sequential data. Trained neural network 745, in some embodiments, may have an architecture similar to the one described above with respect to FIG. 3. The output of classifier 740 may include classification 750 which can be a text description, numerical value, data object, image, or any other data representing a classification of sequential data 710.

FIG. 8 shows denoising architecture data flow 800, which describes the data flow and architecture for one embodiment of a denoising application utilizing disclosed recurrent encoders and decoders. In an example denoising architecture, sequential data can be encoded to its fixed dimensional vector representation then decoded back into sequential data to remove any noise or anomalies within the sequential data. Because the encoder-decoder combination has been trained using many samples of sequential data for a context (e.g., using the methods described above with respect to training data flow 200), and been trained such that the output of the decoder is the same as the input to the encoder, anomalies or errors in sequential data can be filtered.

In denoising architecture data flow 800, encoder input 810 may represent sequential data for a context. For example, encoder input 810 may include natural language, source code, numerical data, images, or any other data where the sequence of data elements affects how the data is interpreted. Encoder input 810 may be provided as input to trained encoder 820. Trained encoder 820 can be an encoder that has been trained consistent with disclosed embodiments (e.g., trained data flow 200) for generating a fixed dimensional vector representation of sequential data that is of the same context as encoder input 810. For example, training encoder 820 can be trained using natural language, source code, numerical data, images, or any other data where the sequence of data elements affects how the data is interpreted.

Consistent with disclosed embodiments, trained encoder 820 outputs encoded fixed dimensional vector 830, which is a fixed dimensional vector representation of encoder input 810. Encoded fixed dimensional vector 830 can then be provided as input to trained decoder 840. Like trained encoder 820, trained decoder 840 can be a decoder that has been trained consistent with disclosed embodiments (e.g., trained data flow 200) and trained concurrently with trained encoder 820, as described above with respect to trained data flow 200. Trained decoder 840 outputs decoder output 850, which can be sequential data of the same context as encoder input 810.

In some embodiments, denoiser 860 takes as input decoder output 850 and encoder input 810 and performs a comparison. If there are differences, denoiser 860 may output filtered data 870 representing data consistent with encoder input 810 but without noise or anomalies. In some embodiments, filtered data 870 may be the same as decoder output 850. In some embodiments, denoiser 860 may also output noise 880 representing the differences between encoder input 810 and decoder output 850.

Figure 9:
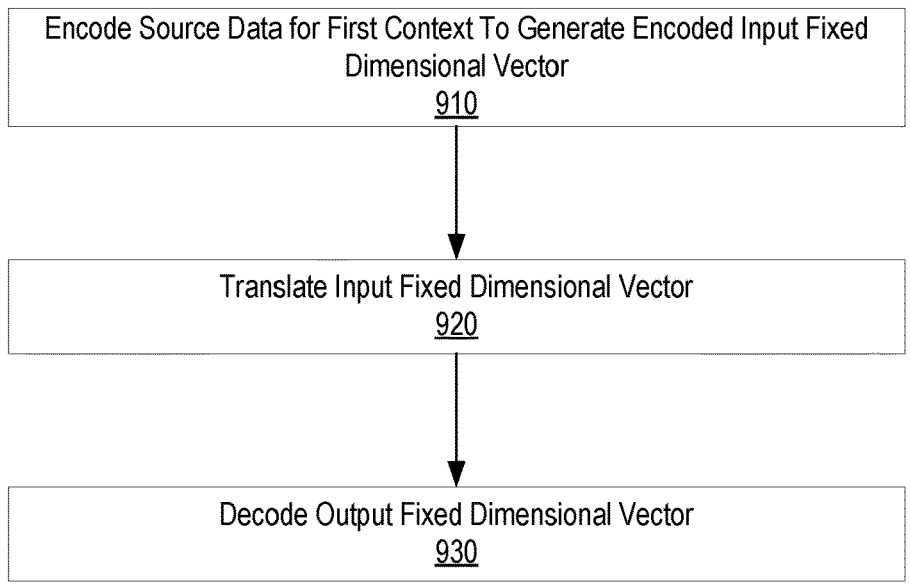
FIG. 9 shows a flow chart for a translation process consistent with disclosed embodiments.

FIG. 9 shows a flowchart representing an example translation process 900 for performing translation of first sequential data from a first context to second sequential data of a second context. According to some embodiments, translation process 900 can be performed by one or more components of a computer system providing translation services such as provider computer system 140. Although the following discussion describes translation process 900 as being performed by a provider computer system, other components of a computer system configured to perform translation services can perform translation process 900 without departing from the spirit and scope of the present disclosure.

Translation process 900 begins at step 910 where source data of a first context is encoded into an encoded input fixed dimensional vector. The source data of the first context may be sequential data in some embodiments. For example, source data of a first context may include natural language text in a first language such as German. At step 920, the encoded input fixed dimensional vector is translated using techniques described herein to generate an output encoded fixed dimensional vector representation of target data of a second context. For example, the input fixed dimensional vector may be translated using a neural network trained to translate fixed dimensional vectors corresponding to the first context to fixed dimensional vectors corresponding to the second context. In some embodiments, the target data of the second context may be sequential data in some embodiments. For example, target data of the second context may include natural language text in a second language such as Russian. In some embodiments, the second context may be a different context than the first context. For example, the second context may be a second language such as Russian, when the first context is a first language such as German. Once translated, the output encoded fixed dimensional vector can be decoded using a decoding recurrent neural network to create the target data consistent with disclosed embodiments.

Figure 10:
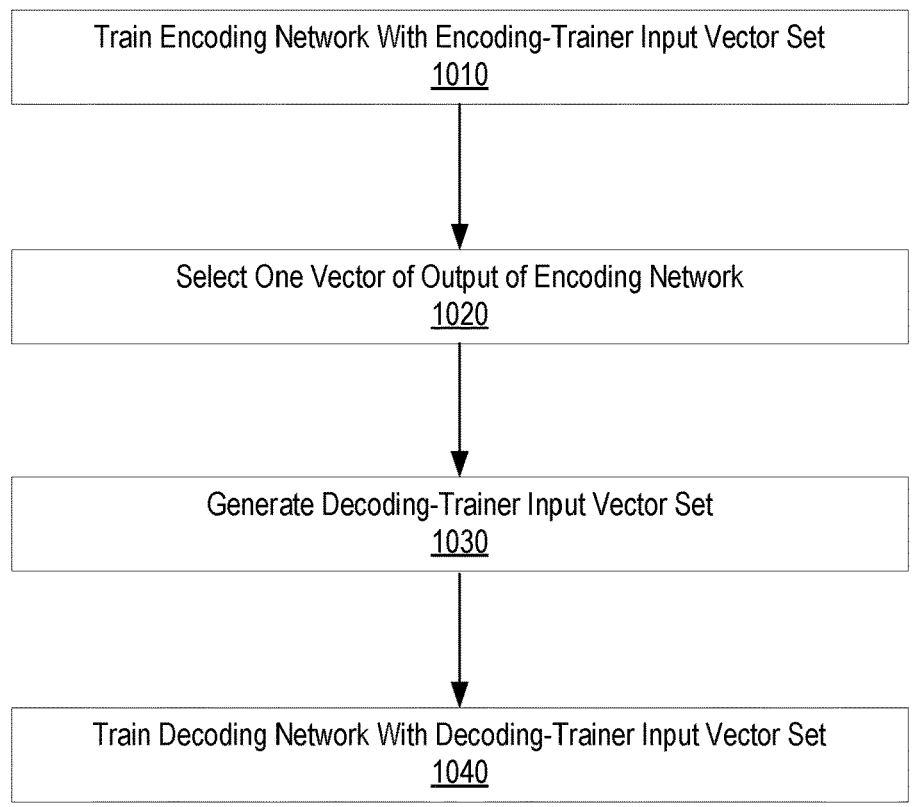
FIG. 10 shows a flow chart for a training process consistent with disclosed embodiments.

FIG. 10 shows a flowchart representing an example training process 1000 for training a recurrent encoder and a recurrent decoder for a data context. According to some embodiments, training process 1000 can be performed by one or more components of a computer system configured to train neural networks, such as trainer computer system 110. Although the following discussion describes training process 1000 as being performed by a training computer system, other components of a computer system configured to perform neural network training services can perform training process 1000 without departing from the spirit and scope of the present disclosure.

Training process 1000 begins at step 1010 where an encoding neural network is trained using an encoding trainer input vector set consistent with disclosed embodiments, such as the embodiments described above with respect to training data flow 200. In some embodiments, the encoding trainer input vector set corresponds to sequential data. In some embodiments, the encoding neural network is trained such that it outputs an encoding-trainer output vector set which is the additive inverse of the encoding trainer input vector set. At step 1020, one vector of the encoding-trainer output vector set is selected. In some embodiments, the selected vector may be the first vector of the encoding-trainer output vector set, the last vector of the encoding-trainer output vector set, or any other vector of the encoding-trainer output vector set depending on the embodiment. At step 1030, a decoding trainer input vector set is created by concatenating the selected encoding vector with a beginning of sequence vector and concatenating the selected encoding vector with each non-selected vector of the encoding-training output vector set. Training process 1000 continues by applying the generated decoding-trainer input vector set to the decoding neural network so that the decoding neural network outputs an additive inverse of the encoding-trainer input vector set (at step 1040).

Figure 11:
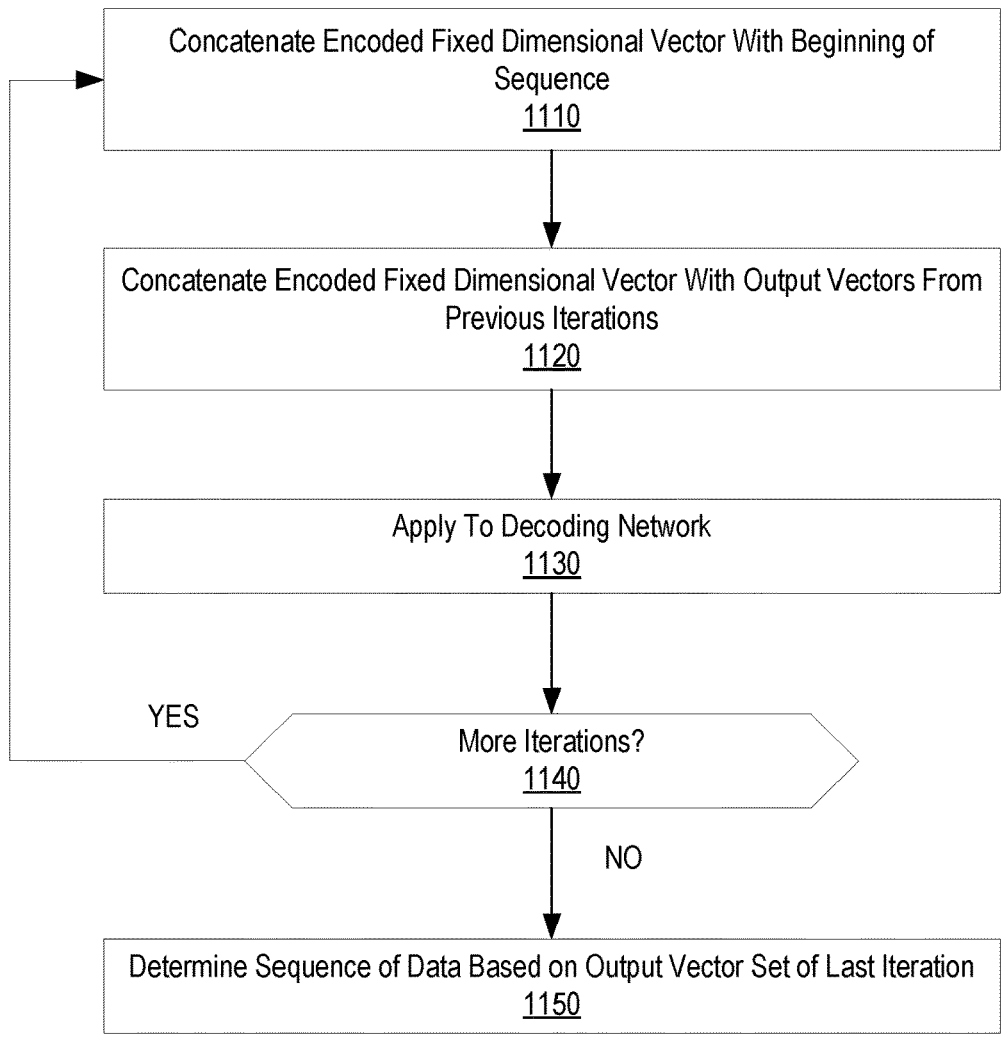
FIG. 11 shows a flow chart for a decoding process consistent with disclosed embodiments.

FIG. 11 shows a flowchart representing an example decoding process 1100 for decoding a fixed dimensional vector representation of a data context to sequential data corresponding if the data context. According to some embodiments, decoding process 1100 can be performed by one or more components of a computer system providing decoding services such as provider computer system 140. Although the following discussion describes decoding process 1100 as being performed by a provider computer system, other components of a computer system configured to perform decoding services can perform decoding process 1100 without departing from the spirit and scope of the present disclosure.

In some embodiments, decoding process 1100 is an iterative process that iterates depending on a set size. The set size may correspond to the sequence length of sequential data that was used to train the decoder performing decoding process 1100. For example, if the decoder performing decoding process 1100 was trained using a sequence length of 5, decoding process 1100 may be performed 5 times.

The iterations of the decoding process 1100 begin at step 1110 where an encoded fixed dimensional vector is concatenated with the beginning of sequence vector to configure the first vector of an ordered input vector set. The ordered input vector set may include the same number of vectors as the sequence length or the number of iterations for which decoding process 1100 is performed.

Decoding process 1100 continues, at step 1120, by concatenating the encoded fixed dimensional vector with an ordered output vector set. In some embodiments, the ordered output vector set is a set of vectors, or subset of vectors, output by the decoding neural network on previous iterations as described below and is also described above with respect to FIGS. 5A-5D. The concatenation of the encoded fixed dimensional vector with the ordered output vector set is used by decoding process 1100 to configure the subsequent vectors of the ordered input vector set. For example, the ordered input vector set may be of size four. The first vector in the ordered input vector set can be the concatenation of the encoded fixed dimensional vector with the beginning of sequence vector. If the output vector set includes two vectors, the second vector of the ordered input vector set can be the concatenation of the encoded fixed dimensional vector with the first vector of the output vector set, and the third vector of the ordered input vector set can be the concatenation of the encoded fixed dimensional vector with a second vector of the output vector set. If the number of vectors in the order input vector set exceeds the number of vectors in the output vector set, then the remaining vectors in the ordered input vector set can be filled with the concatenation of the encoded fixed dimensional vector with a placeholder vector (having elements of known value indicating noise or a placeholder). Using the example above, the fourth vector of the order input vector set can be the concatenation of the encoded fixed dimensional vector with the placeholder vector.

At step 1130, the ordered input vector set is applied as input to a decoding neural network that has been trained to decode a fixed dimensional vector representation to sequential data for the data context. In some embodiments, the decoding neural network has been trained concurrently with the encoding neural network that was used to encode the encoded fixed dimensional vector. If there are more iterations to perform (step 1140:YES), decoding process 1100 returns to step 1110. But, if there are no more iterations to perform because decoding process 1100 has performed a set size number of iterations (step 1140:NO), then decoding process 1100 determines the corresponding sequence of data based on the output vector set of the last iteration. For example, in some embodiments, decoding process 1100 may utilize an embedding layer to determine sequential data, or indices representing sequential data. If decoding process 1100 uses an embedding layer to determine indices for sequential data, it may further determine elements of sequential data based on the indices consistent with embodiments disclosed herein.

Figure 12:
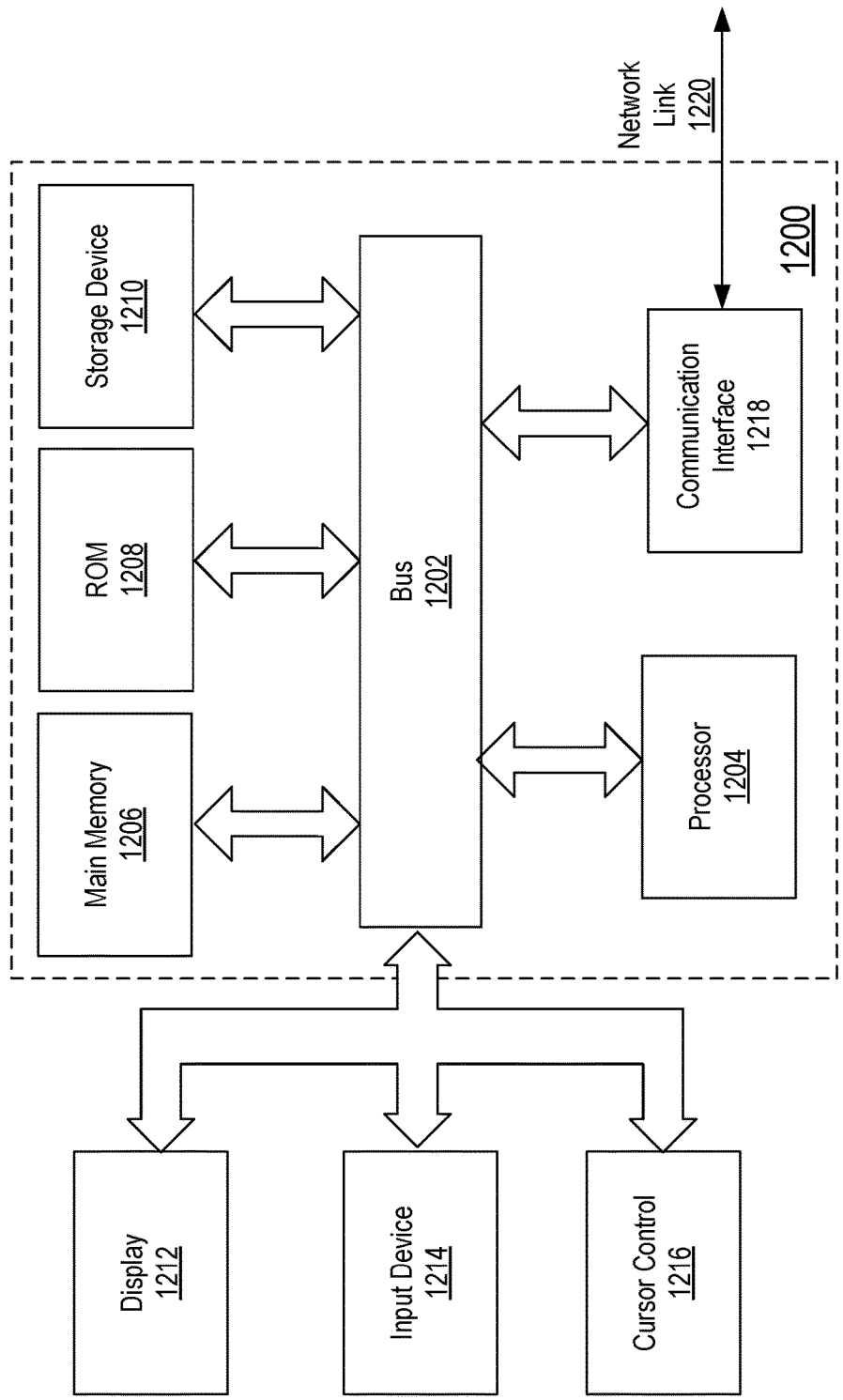
FIG. 12 shows, in block form, a computer system with which embodiments of the present disclosure can be implemented.

FIG. 12 is a block diagram of an exemplary computer system 1200, consistent with embodiments of the present disclosure. The components of system 100, such as training computer system 110, training data sources 120, requester computer system 130 and provider computer system 140 can include an architecture based on, or similar to, that of computer system 1200.

As illustrated in FIG. 12, computer system 1200 includes bus 1202 or other communication mechanism for communicating information, and hardware processor 1204 coupled with bus 1202 for processing information. Hardware processor 1204 can be, for example, a general purpose microprocessor. Computer system 1200 also includes a main memory 1206, such as a random access memory (RAM) or other dynamic storage device, coupled to bus 1202 for storing information and instructions to be executed by processor 1204. Main memory 1206 also can be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

In some embodiments, computer system 1200 can be coupled via bus 1202 to display 1212, such as a cathode ray tube (CRT), liquid crystal display, or touch screen, for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. The input device typically has two degrees of freedom in two axes, a first axis (for example, x) and a second axis (for example, y), that allows the device to specify positions in a plane.

Computer system 1200 can implement disclosed embodiments using customized hard-wired logic, one or more ASICs or FPGAs, firmware and/or program logic which in combination with the computer system causes or programs computer system 1200 to be a special-purpose machine. According to some embodiments, the operations, functionalities, and techniques disclosed herein are performed by computer system 1200 in response to processor 1204 executing one or more sequences of one or more instructions contained in main memory 1206. Such instructions can be read into main memory 1206 from another storage medium, such as storage device 1210. Execution of the sequences of instructions contained in main memory 1206 causes processor 1204 to perform process steps consistent with disclosed embodiments. In some embodiments, hard-wired circuitry can be used in place of or in combination with software instructions.

The term storage media can refer, but is not limited, to any non-transitory media that stores data and/or instructions that cause a machine to operate in a specific fashion. Such storage media can comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infrared data communications.

Various forms of media can be involved in carrying one or more sequences of one or more instructions to processor 1204 for execution. For example, the instructions can initially be carried on a magnetic disk or solid state drive of a remote computer. The remote computer can load the instructions into its dynamic memory and send the instructions over a network line communication line using a modem, for example. A modem local to computer system 1200 can receive the data from the network communication line and can place the data on bus 1202. Bus 1202 carries the data to main memory 1206, from which processor 1204 retrieves and executes the instructions. The instructions received by main memory 1206 can optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network. For example, communication interface 1218 can be an integrated services digital network (ISDN) card, cable modem, satellite modem, or a modem to provide a data communication connection to a corresponding type of telephone line. As another example, communication interface 1218 can be a local area network (LAN) card to provide a data communication connection to a compatible LAN. Communication interface 1218 can also use wireless links. In any such implementation, communication interface 1218 sends and receives electrical, electromagnetic or optical signals that carry digital data streams representing various types of information.

Network link 1220 typically provides data communication through one or more networks to other data devices. For example, network link 1220 can provide a connection through local network 1222 to other computing devices connected to local network 1222 or to an external network, such as the Internet or other Wide Area Network. These networks use electrical, electromagnetic or optical signals that carry digital data streams. The signals through the various networks and the signals on network link 1220 and through communication interface 1218, which carry the digital data to and from computer system 1200, are example forms of transmission media. Computer system 1200 can send messages and receive data, including program code, through the network(s), network link 1220 and communication interface 1218. In the Internet example, a server (not shown) can transmit requested code for an application program through the Internet (or Wide Area Network) the local network, and communication interface 1218. The received code can be executed by processor 1204 as it is received, and/or stored in storage device 1210, or other non-volatile storage for later execution.

According to some embodiments, trainer computer system 110 and/or provider computer system 140 can be implemented using a quantum computing system. In general, a quantum computing system is one that makes use of quantum-mechanical phenomena to perform data operations. As opposed to traditional computers that are encoded using bits, quantum computers use qubits that represent a superposition of states. Computer system 1200, in quantum computing embodiments, can incorporate the same or similar components as a traditional computing system, but the implementation of the components may be different to accommodate storage and processing of qubits as opposed to bits. For example, quantum computing embodiments can include implementations of processor 1204, memory 1206, and bus 1202 specialized for qubits. However, while a quantum computing embodiment may provide processing efficiencies, the scope and spirit of the present disclosure is not fundamentally altered in quantum computing embodiments.

According to some embodiments, one or more components of trainer computer system 110 and/or provider computer system 140 can be implemented using a cellular neural network (CNN). A CNN is an array of systems (cells) or coupled networks connected by local connections. In a typical embodiment, cells are arranged in two-dimensional grids where each cell has eight adjacent neighbors. Each cell has an input, a state, and an output, and it interacts directly with the cells within its neighborhood, which is defined as its radius. Like neurons in an artificial neural network, the state of each cell in a CNN depends on the input and output of its neighbors, and the initial state of the network. The connections between cells can be weighted, and varying the weights on the cells affects the output of the CNN.

In the foregoing disclosure, embodiments have been described with reference to numerous specific details that can vary from implementation to implementation. Certain adaptations and modifications of the embodiments described herein can be made. Therefore, the above embodiments are considered to be illustrative and not restrictive.

Furthermore, throughout this disclosure, several embodiments were described as containing modules and/or components. In general, the word module or component, as used herein, refers to logic embodied in hardware or firmware, or to a collection of software instructions, possibly having entry and exit points, written in a programming language, such as, for example, C, C++, or C #, Java, or some other commonly used programming language. A software module may be compiled and linked into an executable program, installed in a dynamic link library, or may be written in an interpreted programming language such as, for example, BASIC, Perl, or Python. It will be appreciated that software modules can be callable from other modules or from themselves, and/or may be invoked in response to detected events or interrupts. Software modules can be stored in any type of computer-readable medium, such as a memory device (e.g., random access, flash memory, and the like), an optical medium (e.g., a CD, DVD, BluRay, and the like), firmware (e.g., an EPROM), or any other storage medium. The software modules may be configured for execution by one or more processors in order to cause the computer systems disclosed herein to perform particular operations. It will be further appreciated that hardware modules can be comprised of connected logic units, such as gates and flip-flops, and/or can be comprised of programmable units, such as programmable gate arrays or processors. Generally, the modules described herein refer to logical modules that can be combined with other modules or divided into sub-modules despite their physical organization or storage.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

The algorithms and systems presented herein are not inherently related to any particular computer or other apparatus. Various general purpose systems may be used with programs in accordance with the teachings herein, or it may prove convenient to construct a more specialized apparatus to perform the required method steps. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the aspects enumerated below, along with the full scope of equivalents to which such aspects are entitled.

What is claimed is:

1. A method for translating between a first context and a second context comprising:
    encoding source data of the first context using an encoding neural network to create an encoded input fixed dimensional vector representation of the source data;
    applying the encoded input fixed dimensional vector as input to a translator neural network trained to generate an output encoded fixed dimensional vector representation of target data of the second context, wherein the first context and second context differ; and
    decoding the output encoded fixed dimensional vector representation using a decoding neural network to recreate the target data,
    wherein the decoding neural network has been trained by applying a plurality of encoded fixed dimensional vectors representing sequential data encoded from a second data corpus of the second context as input to the decoding neural network.

2. The method of claim 1, wherein the encoding neural network is trained by applying a plurality of sequences of training input vectors from a first data corpus of the first context as input to the encoding neural network.

3. The method of claim 1, wherein encoding the source data using the encoding neural network includes:
    generating a sequence of input vectors corresponding the source data,
    applying the sequence of input vectors to the encoding neural network; and,
    selecting one vector from an output of the encoding neural network.

4. The method of claim 3, wherein generating the sequence of input vectors corresponding to the source data includes:
    generating sequential indices for the source data, and
    mapping the sequential indices to vectors in an embedding layer.

5. The method of claim 1, wherein applying the plurality of encoded fixed dimensional vectors representing sequential data from the second data corpus includes: creating training vector sets for each of the plurality of encoded fixed dimensional vectors.

6. The method of claim 5, wherein creating the training vector sets for each of the plurality of encoded fixed dimensional vectors includes concatenating the each of the plurality of encoded fixed dimensional vectors with a beginning of sequence vector and a subset of vectors used to encode the each of the plurality of encoded fixed dimensional vectors.

7. The method of claim 1, wherein decoding the output encoded fixed dimensional vector representation using the decoding neural network includes concatenating the output encoded fixed dimensional vector representation with a beginning of sequence vector used when training the decoding neural network.

8. The method of claim 7, wherein decoding the output encoded fixed dimensional vector representation using the decoding neural network further includes concatenating the output encoded fixed dimensional vector representation with one or more output vectors of the decoding neural network.

9. A system for translating between a first context and a second context comprising:
one or more processors; and
one or more computer-readable media storing computer-executable instructions that, when executed by the one or more processors, cause the one or more processors to perform actions comprising:
encoding source data of the first context using an encoding neural network to create an encoded input fixed dimensional vector representation of the source data;
applying the encoded input fixed dimensional vector as input to a translator neural network trained to generate an output encoded fixed dimensional vector representation of target data of the second context, wherein the first context and second context differ; and
decoding the output encoded fixed dimensional vector representation using a decoding neural network to recreate the target data,
wherein the decoding neural network has been trained by applying a plurality of encoded fixed dimensional vectors representing sequential data encoded from a second data corpus of the second context as input to the decoding neural network.

10. The system of claim 9, wherein the encoding neural network has been trained by applying a plurality of sequences of training input vectors from a first data corpus of the first context as input to the encoding neural network.

11. The system of claim 9, wherein the computer-executable instructions cause the one or more processors to encode the source data using the encoding neural network by further causing the one or more processors to perform further actions comprising:
generating a sequence of input vectors corresponding the source data,
applying the sequence of input vectors to the encoding neural network; and,
selecting one vector from an output of the encoding neural network.

12. The system of claim 11, wherein the computer-executable instructions cause the one or more processors to generate the sequence of input vectors corresponding to the source data by further causing the one or more processors to perform further actions comprising:
generating sequential indices for the source data, and
mapping the sequential indices to vectors in an embedding layer.

13. The system of claim 9, wherein the computer-executable instructions cause the one or more processors to apply the plurality of encoded fixed dimensional vectors representing sequential data from the second data corpus by further causing the one or more processors to perform further actions comprising creating training vector sets for each of the plurality of encoded fixed dimensional vectors.

14. The system of claim 13, wherein the computer-executable instructions cause the one or more processors to create the training vector sets for each of the plurality of encoded fixed dimensional vectors by further causing the one or more processors to perform further actions comprising concatenating the each of the plurality of encoded fixed dimensional vectors with a beginning of sequence vector and a subset of vectors used to encode the each of the plurality of encoded fixed dimensional vectors.

15. The system of claim 9, wherein the computer-executable instructions cause the one or more processors to decode the output encoded fixed dimensional vector representation using the decoding neural network by further causing the one or more processors to perform further actions comprising: concatenating the output encoded fixed dimensional vector representation with a beginning of sequence vector used when training the decoding neural network.

16. The system of claim 15, wherein the computer-executable instructions cause the one or more processors to decode the output encoded fixed dimensional vector representation using the decoding neural network by further causing the one or more processors to perform further actions comprising concatenating the output encoded fixed dimensional vector representation with one or more output vectors of the decoding neural network.

17. A non-transitory computer readable medium storing instructions that, when executed by one or more computing devices, cause the one or more computing devices to perform actions comprising:
encoding source data of a first context using an encoding neural network to create an encoded input fixed dimensional vector representation of the source data;
applying the encoded input fixed dimensional vector as input to a translator neural network trained to generate an output encoded fixed dimensional vector representation of target data of a second context, wherein the first context and second context differ; and
decoding the output encoded fixed dimensional vector representation using a decoding neural network to recreate the target data,
wherein the decoding neural network has been trained by applying a plurality of encoded fixed dimensional vectors representing sequential data encoded from a second data corpus of the second context as input to the decoding neural network.

18. The non-transitory computer readable medium of claim 17, wherein the encoding neural network has been trained by applying a plurality of sequences of training input vectors from a first data corpus of the first context as input to the encoding neural network.

19. The non-transitory computer readable medium of claim 17, wherein the instructions further cause the one or more computing devices to concatenate the output encoded fixed dimensional vector representation with a beginning of sequence vector used when training the decoding neural network.

20. The non-transitory computer readable medium of claim 19, wherein the instructions further cause the one or more computing devices to concatenate the output encoded fixed dimensional vector representation with one or more output vectors of the decoding neural network.

* * * * *